US009130954B2

(12) United States Patent
Joshi et al.

(10) Patent No.: US 9,130,954 B2
(45) Date of Patent: *Sep. 8, 2015

(54) DISTRIBUTED HEALTH CHECK FOR GLOBAL SERVER LOAD BALANCING

(75) Inventors: Prajakta S. Joshi, Santa Clara, CA (US); David Chun Ying Cheung, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 1542 days.

This patent is subject to a terminal disclaimer.

(21) Appl. No.: 10/305,823

(22) Filed: Nov. 27, 2002

(65) Prior Publication Data

US 2010/0121932 A1    May 13, 2010

Related U.S. Application Data

(63) Continuation-in-part of application No. 09/670,487, filed on Sep. 26, 2000, now Pat. No. 7,454,500.

(51) Int. Cl.
*H04L 29/08* (2006.01)
(52) U.S. Cl.
CPC ........ *H04L 67/1008* (2013.01); *H04L 67/1002* (2013.01); *H04L 67/1021* (2013.01); *H04L 67/1012* (2013.01)
(58) Field of Classification Search
CPC ............ H04L 67/1002; H04L 61/1511; H04L 67/1017; H04L 67/1038; H04L 47/125; G06F 9/505
USPC .......................................... 709/226, 223, 213
See application file for complete search history.

(56) References Cited

U.S. PATENT DOCUMENTS

| 5,031,094 A | 7/1991 | Toegel et al. ................. 364/200 |
| 5,359,593 A | 10/1994 | Derby et al. .................... 370/17 |

(Continued)

FOREIGN PATENT DOCUMENTS

| EP | 1128613 | 8/2001 |
| WO | 01/39003 | 5/2001 |
| WO | 01/93530 | 12/2001 |

OTHER PUBLICATIONS

Genova et al., "Challenges in URL Switching for Implementing Globally Distributed Web Sites," IEEE, pp. 89-94, 2000.*

(Continued)

*Primary Examiner* — Backhean Tiv
(74) *Attorney, Agent, or Firm* — Novak Druce Connolly Bove + Quigg LLP

(57) ABSTRACT

A global server load-balancing (GSLB) switch serves as a proxy to an authoritative DNS and communicates with numerous site switches that are coupled to host servers serving specific applications. The GSLB switch receives from site switches operational information regarding host servers within the site switches neighborhood. This operational information includes health check information that is remotely obtained in a distributed manner from remote metric agents at the site switches. When a client program requests a resolution of a host name, the GSLB switch, acting as a proxy of an authoritative DNS, returns one or more ordered IP addresses for the host name. The IP addresses are ordered using metrics, including the health check metric that evaluates these IP addresses based on the health check information communicated to the GSLB switch in a distributed manner by the distributed health check site switches. In one instance, the GSLB switch places the address that is deemed "best" at the top of the list.

20 Claims, 3 Drawing Sheets

(56) References Cited

U.S. PATENT DOCUMENTS

| | | | |
|---|---|---|---|
| 5,530,872 A * | 6/1996 | Smeltzer et al. | 710/260 |
| 5,539,883 A | 7/1996 | Allon et al. | |
| 5,867,706 A | 2/1999 | Martin et al. | |
| 5,918,017 A | 6/1999 | Attanasio et al. | |
| 5,948,061 A | 9/1999 | Merriman et al. | 709/219 |
| 5,951,634 A | 9/1999 | Sitbon et al. | 709/105 |
| 6,006,269 A | 12/1999 | Phaal | |
| 6,006,333 A | 12/1999 | Nielsen | |
| 6,012,088 A | 1/2000 | Li et al. | |
| 6,078,956 A | 6/2000 | Bryant et al. | |
| 6,092,178 A * | 7/2000 | Jindal et al. | 712/27 |
| 6,112,239 A | 8/2000 | Kenner et al. | 709/224 |
| 6,115,752 A | 9/2000 | Chauhan | 709/241 |
| 6,119,143 A | 9/2000 | Dias et al. | |
| 6,128,279 A | 10/2000 | O'Neil et al. | 370/229 |
| 6,128,642 A | 10/2000 | Doraswamy et al. | 709/201 |
| 6,134,588 A | 10/2000 | Guenthner et al. | |
| 6,148,410 A | 11/2000 | Baskey et al. | |
| 6,157,649 A | 12/2000 | Peirce et al. | |
| 6,167,445 A | 12/2000 | Gai et al. | |
| 6,167,446 A | 12/2000 | Lister et al. | 709/223 |
| 6,178,160 B1 | 1/2001 | Bolton et al. | |
| 6,182,139 B1 | 1/2001 | Brendel | 709/226 |
| 6,185,619 B1 | 2/2001 | Joffe et al. | |
| 6,195,691 B1 | 2/2001 | Brown | |
| 6,205,477 B1 | 3/2001 | Johnson et al. | |
| 6,233,604 B1 | 5/2001 | Van Horne et al. | 709/203 |
| 6,249,801 B1 | 6/2001 | Zisapel et al. | |
| 6,256,671 B1 | 7/2001 | Strentzsch et al. | |
| 6,260,070 B1 | 7/2001 | Shah | |
| 6,262,976 B1 | 7/2001 | McNamara | |
| 6,286,039 B1 | 9/2001 | Van Horne et al. | 709/221 |
| 6,286,047 B1 | 9/2001 | Ramanathan et al. | 709/224 |
| 6,286,048 B1 | 9/2001 | Moberg | |
| 6,304,913 B1 | 10/2001 | Rune | |
| 6,317,775 B1 | 11/2001 | Coile et al. | |
| 6,324,177 B1 | 11/2001 | Howes et al. | |
| 6,324,580 B1 | 11/2001 | Jindal et al. | 709/228 |
| 6,327,622 B1 | 12/2001 | Jindal et al. | |
| 6,330,605 B1 | 12/2001 | Christensen et al. | |
| 6,336,137 B1 | 1/2002 | Lee et al. | |
| 6,378,068 B1 * | 4/2002 | Foster et al. | 713/1 |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,405,252 B1 | 6/2002 | Gupta et al. | |
| 6,411,998 B1 | 6/2002 | Bryant et al. | |
| 6,427,170 B1 | 7/2002 | Sitaraman et al. | 709/226 |
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,473,802 B2 | 10/2002 | Masters | |
| 6,480,508 B1 | 11/2002 | Mwikalo et al. | 370/475 |
| 6,487,555 B1 | 11/2002 | Bharat et al. | |
| 6,490,624 B1 | 12/2002 | Sampson et al. | |
| 6,513,061 B1 | 1/2003 | Ebata et al. | |
| 6,542,964 B1 | 4/2003 | Scharber | |
| 6,549,944 B1 | 4/2003 | Weinberg et al. | 709/224 |
| 6,578,066 B1 * | 6/2003 | Logan et al. | 718/105 |
| 6,578,077 B1 | 6/2003 | Rakoshitz et al. | |
| 6,601,084 B1 | 7/2003 | Bhaskaran et al. | |
| 6,606,643 B1 | 8/2003 | Emens et al. | 709/203 |
| 6,611,861 B1 | 8/2003 | Schairer et al. | |
| 6,647,009 B1 | 11/2003 | Tsuruoka et al. | |
| 6,665,702 B1 | 12/2003 | Zisapel et al. | |
| 6,681,232 B1 * | 1/2004 | Sistanizadeh et al. | 707/104.1 |
| 6,681,323 B1 * | 1/2004 | Fontanesi et al. | 713/1 |
| 6,684,250 B2 | 1/2004 | Anderson et al. | |
| 6,691,165 B1 | 2/2004 | Bruck et al. | |
| 6,701,368 B1 * | 3/2004 | Chennapragada et al. | 709/228 |
| 6,718,387 B1 | 4/2004 | Gupta et al. | |
| 6,725,253 B1 * | 4/2004 | Okano et al. | 709/203 |
| 6,745,241 B1 | 6/2004 | French et al. | 709/221 |
| 6,748,416 B2 | 6/2004 | Carpenter et al. | |
| 6,751,191 B1 | 6/2004 | Davar et al. | |
| 6,754,699 B2 | 6/2004 | Swildens et al. | |
| 6,760,775 B1 | 7/2004 | Anerousis | |
| 6,772,211 B2 | 8/2004 | Lu et al. | |
| 6,775,230 B1 * | 8/2004 | Watanabe et al. | 370/228 |
| 6,779,017 B1 | 8/2004 | Lamberton et al. | |
| 6,785,704 B1 | 8/2004 | McCanne | |
| 6,789,125 B1 | 9/2004 | Aviani et al. | 709/238 |
| 6,795,434 B1 | 9/2004 | Kumar et al. | |
| 6,795,858 B1 | 9/2004 | Jain et al. | |
| 6,795,860 B1 | 9/2004 | Shah | |
| 6,801,949 B1 | 10/2004 | Bruck et al. | |
| 6,810,411 B1 | 10/2004 | Coughlin et al. | |
| 6,826,198 B2 | 11/2004 | Turina et al. | 370/467 |
| 6,839,700 B2 * | 1/2005 | Doyle et al. | 707/719 |
| 6,850,984 B1 | 2/2005 | Kalkunte et al. | 709/229 |
| 6,862,627 B1 | 3/2005 | Cheshire | |
| 6,874,152 B2 | 3/2005 | Vermeire et al. | |
| 6,879,995 B1 | 4/2005 | Chinta et al. | 709/204 |
| 6,880,000 B1 | 4/2005 | Tominaga et al. | |
| 6,883,028 B1 | 4/2005 | Johnson et al. | |
| 6,898,633 B1 | 5/2005 | Lyndersay et al. | 709/226 |
| 6,901,081 B1 | 5/2005 | Ludwig | |
| 6,920,498 B1 | 7/2005 | Gourlay et al. | |
| 6,928,485 B1 | 8/2005 | Krishnamurthy et al. | |
| 6,934,292 B1 | 8/2005 | Ammitzboell | |
| 6,950,848 B1 | 9/2005 | Yousefi'zadeh | |
| 6,963,914 B1 | 11/2005 | Breitbart et al. | 709/226 |
| 6,963,917 B1 | 11/2005 | Callis et al. | 709/227 |
| 6,968,389 B1 | 11/2005 | Menditto et al. | |
| 6,976,090 B2 | 12/2005 | Ben-Shaul et al. | |
| 6,985,956 B2 | 1/2006 | Luke et al. | |
| 6,987,763 B2 | 1/2006 | Rochberger et al. | 370/389 |
| 6,996,551 B2 * | 2/2006 | Hellerstein et al. | 706/48 |
| 6,996,615 B1 | 2/2006 | McGuire | 709/226 |
| 6,996,616 B1 | 2/2006 | Leighton et al. | |
| 7,000,007 B1 | 2/2006 | Valenti | 709/219 |
| 7,006,431 B1 | 2/2006 | Kanekar et al. | |
| 7,020,698 B2 | 3/2006 | Andrews et al. | 709/223 |
| 7,020,714 B2 | 3/2006 | Kalyanaraman et al. | |
| 7,028,083 B2 * | 4/2006 | Levine et al. | 709/223 |
| 7,032,010 B1 | 4/2006 | Swildens et al. | 709/219 |
| 7,032,031 B2 | 4/2006 | Jungck et al. | |
| 7,036,039 B2 | 4/2006 | Holland | |
| 7,042,876 B1 | 5/2006 | Jayasenan et al. | |
| 7,047,300 B1 | 5/2006 | Oehrke et al. | |
| 7,058,706 B1 | 6/2006 | Iyer et al. | |
| 7,058,717 B2 | 6/2006 | Chao et al. | |
| 7,061,942 B2 | 6/2006 | Noronha, Jr. et al. | |
| 7,062,562 B1 | 6/2006 | Baker et al. | |
| 7,062,642 B1 | 6/2006 | Langrind et al. | |
| 7,072,332 B2 | 7/2006 | D'Souza | |
| 7,080,138 B1 | 7/2006 | Baker et al. | |
| 7,082,102 B1 | 7/2006 | Wright | |
| 7,086,061 B1 * | 8/2006 | Joshi et al. | 718/105 |
| 7,089,293 B2 | 8/2006 | Grosner et al. | |
| 7,099,915 B1 | 8/2006 | Tenereillo et al. | |
| 7,114,008 B2 | 9/2006 | Jungck et al. | |
| 7,117,269 B2 | 10/2006 | Lu et al. | |
| 7,117,530 B1 | 10/2006 | Lin | |
| 7,124,188 B2 | 10/2006 | Mangipudi et al. | |
| 7,127,713 B2 | 10/2006 | Davis et al. | |
| 7,136,932 B1 | 11/2006 | Schneider | |
| 7,139,242 B2 | 11/2006 | Bays | |
| 7,139,926 B1 | 11/2006 | Madhav et al. | |
| 7,177,933 B2 * | 2/2007 | Foth | 709/226 |
| 7,185,052 B2 | 2/2007 | Day | |
| 7,194,553 B2 | 3/2007 | Lucco et al. | |
| 7,197,547 B1 | 3/2007 | Miller et al. | |
| 7,206,806 B2 | 4/2007 | Pineau | |
| 7,213,068 B1 | 5/2007 | Kohli et a | |
| 7,225,236 B1 * | 5/2007 | Puthiyandyil et al. | 709/218 |
| 7,225,272 B2 | 5/2007 | Kelley et al. | |
| 7,227,872 B1 | 6/2007 | Biswas et al. | |
| 7,240,015 B1 | 7/2007 | Karmouch et al. | |
| 7,240,100 B1 | 7/2007 | Wein et al. | |
| 7,254,626 B1 * | 8/2007 | Kommula et al. | 709/223 |
| 7,257,642 B1 | 8/2007 | Bridger et al. | |

(56) References Cited

U.S. PATENT DOCUMENTS

| | | | |
|---|---|---|---|
| 7,260,645 B2 | 8/2007 | Bays | |
| 7,277,954 B1 | 10/2007 | Stewart et al. | |
| 7,289,519 B1 | 10/2007 | Liskov | |
| 7,296,088 B1 | 11/2007 | Padmanabhan et al. | |
| 7,308,503 B2 | 12/2007 | Giraud et al. | |
| 7,321,926 B1 | 1/2008 | Zhang et al. | |
| 7,330,908 B2 | 2/2008 | Jungck | |
| 7,380,154 B2 | 5/2008 | Gale et al. | |
| 7,383,288 B2 | 6/2008 | Miloushev et al. | |
| 7,423,977 B1 | 9/2008 | Joshi et al. | |
| 7,434,088 B2 | 10/2008 | Gale et al. | |
| 7,441,045 B2 | 10/2008 | Skene et al. | |
| 7,447,739 B1 | 11/2008 | Cunetto et al. | |
| 7,454,500 B1* | 11/2008 | Hsu et al. | 709/226 |
| 7,478,148 B2 | 1/2009 | Neerdaels | |
| 7,496,651 B1* | 2/2009 | Joshi | 709/223 |
| 7,523,181 B2 | 4/2009 | Swildens et al. | |
| 7,573,886 B1 | 8/2009 | Ono | |
| 7,574,508 B1* | 8/2009 | Kommula | 709/226 |
| 7,581,006 B1 | 8/2009 | Lara et al. | |
| 7,581,009 B1* | 8/2009 | Hsu et al. | 709/226 |
| 7,584,262 B1 | 9/2009 | Wang et al. | |
| 7,584,301 B1* | 9/2009 | Joshi | 709/244 |
| 7,594,262 B2 | 9/2009 | Hanzlik et al. | |
| 7,653,700 B1 | 1/2010 | Bahl et al. | |
| 7,657,629 B1* | 2/2010 | Kommula | 709/226 |
| 7,676,576 B1 | 3/2010 | Kommula | |
| 7,734,683 B1 | 6/2010 | Bergenwall et al. | |
| 7,756,965 B2* | 7/2010 | Joshi | 709/223 |
| 7,792,113 B1 | 9/2010 | Foschiano et al. | |
| 7,840,678 B2 | 11/2010 | Joshi | |
| 7,860,964 B2 | 12/2010 | Brady et al. | |
| 7,885,188 B2 | 2/2011 | Joshi | |
| 7,886,023 B1 | 2/2011 | Johnson | |
| 7,899,899 B2* | 3/2011 | Joshi | 709/223 |
| 7,899,911 B2* | 3/2011 | Jensen et al. | 709/227 |
| 7,925,713 B1 | 4/2011 | Day et al. | |
| 7,949,757 B2 | 5/2011 | Joshi | |
| 8,024,441 B2* | 9/2011 | Kommula et al. | 709/223 |
| 8,527,639 B1 | 9/2013 | Liskov et al. | |
| 2001/0049741 A1 | 12/2001 | Skene et al. | |
| 2001/0052016 A1* | 12/2001 | Skene et al. | 709/226 |
| 2002/0026551 A1 | 2/2002 | Kamimaki et al. | 710/260 |
| 2002/0038360 A1 | 3/2002 | Andrews et al. | 709/223 |
| 2002/0046271 A1 | 4/2002 | Huang | |
| 2002/0049778 A1* | 4/2002 | Bell et al. | 707/200 |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1 | 6/2002 | Biliris et al. | 709/238 |
| 2002/0087722 A1 | 7/2002 | Datta et al. | |
| 2002/0091840 A1 | 7/2002 | Pulier et al. | 709/228 |
| 2002/0107841 A1* | 8/2002 | Hellerstein et al. | 707/3 |
| 2002/0112036 A1 | 8/2002 | Bohannon et al. | 709/220 |
| 2002/0120743 A1 | 8/2002 | Shabtay et al. | 709/226 |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | 709/229 |
| 2002/0150048 A1 | 10/2002 | Ha et al. | |
| 2002/0154600 A1 | 10/2002 | Ido et al. | |
| 2002/0156916 A1* | 10/2002 | Watanabe | 709/238 |
| 2002/0186698 A1 | 12/2002 | Ceniza | |
| 2002/0188862 A1 | 12/2002 | Trethewey et al. | 713/201 |
| 2002/0194324 A1 | 12/2002 | Guha | |
| 2002/0194335 A1 | 12/2002 | Maynard | 709/225 |
| 2002/0196735 A1 | 12/2002 | Hayes | |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | 370/401 |
| 2003/0065711 A1 | 4/2003 | Acharya et al. | 709/203 |
| 2003/0065762 A1 | 4/2003 | Stolorz et al. | |
| 2003/0065763 A1* | 4/2003 | Swildens et al. | 709/224 |
| 2003/0074472 A1 | 4/2003 | Lucco et al. | |
| 2003/0105797 A1 | 6/2003 | Dolev et al. | 709/105 |
| 2003/0115283 A1 | 6/2003 | Barbir et al. | |
| 2003/0135509 A1 | 7/2003 | Davis et al. | 707/100 |
| 2003/0154239 A1 | 8/2003 | Davis et al. | 709/201 |
| 2003/0177240 A1* | 9/2003 | Gulko et al. | 709/226 |
| 2003/0210686 A1* | 11/2003 | Terrell et al. | 370/389 |
| 2003/0210694 A1* | 11/2003 | Jayaraman et al. | 370/392 |
| 2003/0229697 A1* | 12/2003 | Borella | 709/226 |
| 2004/0019680 A1 | 1/2004 | Chao et al. | |
| 2004/0024872 A1 | 2/2004 | Kelley et al. | 709/225 |
| 2004/0039798 A1 | 2/2004 | Hotz et al. | |
| 2004/0039847 A1 | 2/2004 | Persson et al. | |
| 2004/0064577 A1 | 4/2004 | Dahlin et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0255018 A1* | 12/2004 | Taraci | 709/223 |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | 710/20 |
| 2005/0033858 A1 | 2/2005 | Swildens et al. | 709/232 |
| 2005/0086295 A1 | 4/2005 | Cunningham et al. | 709/203 |
| 2005/0149531 A1 | 7/2005 | Srivastava | 707/10 |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1* | 2/2006 | Deng et al. | 709/227 |
| 2006/0120366 A1 | 6/2006 | Jayasenan et al. | |
| 2006/0167894 A1 | 7/2006 | Wunner | |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2007/0208877 A1 | 9/2007 | Kelley et al. | |
| 2008/0016233 A1 | 1/2008 | Schneider | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2008/0207200 A1* | 8/2008 | Fein et al. | 455/426.1 |
| 2010/0010991 A1 | 1/2010 | Joshi | |
| 2010/0011120 A1 | 1/2010 | Kommula | |
| 2010/0011126 A1* | 1/2010 | Hsu et al. | 709/249 |
| 2010/0061236 A1 | 3/2010 | Joshi | |
| 2010/0082787 A1* | 4/2010 | Kommula et al. | 709/223 |
| 2010/0115133 A1 | 5/2010 | Joshi | |
| 2010/0121932 A1* | 5/2010 | Joshi et al. | 709/207 |
| 2010/0153558 A1* | 6/2010 | Kommula | 709/226 |
| 2010/0223621 A1 | 9/2010 | Joshi et al. | |
| 2010/0251008 A1* | 9/2010 | Swildens | 714/4 |
| 2010/0293296 A1* | 11/2010 | Hsu et al. | 709/245 |
| 2010/0299427 A1 | 11/2010 | Joshi | |
| 2011/0099261 A1 | 4/2011 | Joshi | |
| 2011/0122771 A1 | 5/2011 | Joshi | |
| 2011/0191459 A1 | 8/2011 | Joshi | |
| 2011/0264798 A1 | 10/2011 | Joshi | |
| 2012/0096166 A1 | 4/2012 | Devarapalli et al. | |

OTHER PUBLICATIONS

Genova et al., "Challenges in URL Switching for Implementing Globally Distributed Web Sites," Department of Computer Science and Engineering, University of South Florida, pp. 1-9, Aug. 11, 2000.*

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

(56) References Cited

OTHER PUBLICATIONS

IBM Corp., *IBM WebSphere Performance Pack: Load Balancing with IBM Secure Way Network Dispatcher*, First Edition, Chapters 1, 2, 4, and 8, Oct. 1999.
IBM Corp., *Secure Way® Network Dispatcher: User's Guide—Version 2.1 for AIX, Solaris, and Windows NT*, Third Edition, Chapters 3, 4, 9, 10, 11, and Appendices C & E, Mar. 1999.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
Bestavros, Azer, "WWW Traffic Reduction and Load Balancing through Server-Based Caching," *IEEE Concurrency*, pp. 56-67, Jan.-Mar. 1997.
Paul, Arindam et al., "Balancing Web Server Load for Adaptable Video Distribution," *IEEE* pp. 469-476, 2000.
AlteonWebSystems, "PCD White Paper," *AlteonWebSystems*, pp. 1-8, Mar. 2001.
Cardellini, V., et al., "Dynamic Load Balancing on Web-server Systems," *IEEE Internet Computing*, 3(3):28-39, May-Jun. 1999.
Foundry Networks, Inc., "Server Load Balancing in Today's Web-enabled Enterprises," *White Paper*, pp. 1-10, Apr. 2002.
Genova, Z., et al., "Challenges in URL Switching for Implementing Globally Distributed Web Sites," *IEEE*, pp. 89-94, 2000.
U.S. Appl. No. 09/670,487, filed Sep. 26, 2000, Hsu et al.
U.S. Appl. No. 10/206,580, filed Jul. 25, 2002, Kommula et al.
U.S. Appl. No. 10/214,921, filed Aug. 7, 2002, Kommula.
U.S. Appl. No. 10/376,903, filed Feb. 28, 2003, Kommula.
U.S. Appl. No. 10/377,364, filed Feb. 28, 2003, Kommula.
U.S. Appl. No. 10/429,177, filed May 5, 2006, Joshi et al.
U.S. Appl. No. 10/674,627, filed Sep. 29, 2003, Joshi.
U.S. Appl. No. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.
U.S. Appl. No. 11/707,697, filed Feb. 16, 2007, Kommula et al.
Genova, Z., et al., "Challenges to URL Switching for Implementing Globally Distributed Web Sites," Department of Computer Science and Engineering, University of South Florida, pp. 1-9, Aug. 11, 2000.
Decision on Petition for Extension of Time in Reexamination (Granted), mailed Dec. 9, 2011, Reexamination Control No. 90/011,765, 3 pages.
Final Office Action for Reexamination Control No. 90/011,765, mailed May 16, 2012, 59 pages.
Request for Inter Partes Reexamination of U.S. Patent No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Order Granting Request for Inter Partes Reexamination of U.S. Patent No. 7,584,301 and Office Action for Reexamination Control No. 95/001,812, mailed Dec. 28, 2011, 25 pages.
Third Party Requester's Comments under 35 U.S.C. § 314(B)(2) and 37 C.F.R. § 1.947, for Reexamination Control No. 95/001,812, filed Mar. 29, 2012, 33 pages.
Action Closing Prosecution, for Reexamination Control No. 95/001,812, mailed Jun. 2, 2012, 49 pages.
Notice of Allowance for U.S. Appl. No. 12/506,130, mailed on Oct. 12, 2010, 49 pages.
Request for Reexamination of U.S. Patent No. 7,840,678, filed Jun. 27, 2011, 25 pages.
Notice of Reexamination Request Filing Date and Notice of Assignment of Reexamination Request, mailed Jul. 1, 2011, Reexamination Control No. 90/011,763, 2 pages.
Ex Parte Interview Summary for Reexamination Control No. 90/011,763, mailed Jul. 5, 2011, 3 pages.
Order Granting Request for Reexamination of U.S. Patent No. 7,840,678, mailed Jul. 29, 2011, Reexamination Control No. 90/011,763, 10 pages.
Office Action for Reexamination Control No. 90/011,763, mailed Oct. 4, 2011, 7 pages.

Decision on Petition for Extension of Time in Reexamination (Granted), mailed Nov. 17, 2011, Reexamination Control No. 90/011,763, 3 pages.
Ex Parte Reexamination Interview Summary for Reexamination Control No. 90/011,763, mailed on Nov. 29, 2011, 57 pages.
Final Office Action for Reexamination Control No. 90/011,763, mailed on Apr. 25, 2012, 51 pages.
Request for Inter Partes Reexamination for U.S. Patent No. 7,840,678, mailed on Nov. 17, 2011, 164 pages.
Notice of Inter Partes Reexamination Request Filing Date and Notice of Assignment of Inter Partes Reexamination Request, mailed Nov. 23, 2011, Reexamination Control No. 95/001,822, 2 pages.
Order Granting Request for Inter Partes Reexamination of U.S. Patent No. 7,840,678 and Office Action for Reexamination Control No. 95/001,822, mailed Jan. 12, 2012, 21 pages.
Third Party Requester's Comments under 35 U.S.C. § 314(B)(2) and 37 C.F.R. § 1.947, for Reexamination Control No. 95/001,822, filed Apr. 11, 2012, 37 pages.
Action Closing Prosecution, for Reexamination Control No. 95/001,822, mailed May 5, 2012, 45 pages.
Notice of Allowance for U.S. Appl. No. 12/938,232, mailed on Apr. 7, 2011, 51 pages.
Non-Final Office Action for U.S. Appl. No. 13/101,398, mailed on Nov. 10, 2011, 58 pages.
Non-Final Office Action for U.S. Appl. No. 10/840,496, mailed on Oct. 18, 2007, 23 pages.
Final Office Action for U.S. Appl. No. 10/840,496, mailed on Aug. 1, 2008, 14 pages.
Notice of Allowance for U.S. Appl. No. 10/840,496, mailed on Oct. 15, 2008, 6 pages.
Non-Final Office Action for U.S. Appl. No. 12/353,701, mailed on Nov. 4, 2009, 22 pages.
Notice of Allowance for U.S. Appl. No. 12/353,701, mailed on Apr. 9, 2010, 15 pages.
Request for Reexamination of U.S. Patent No. 7,756,965, filed Jun. 27, 2011, 38 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 3 pages.
Order Granting Request for Reexamination of U.S. Patent No. 7,756,965, mailed Aug. 19, 2011, Reexamination Control No. 90/011,761, 9 pages.
Office Action for Reexamination Control No. 90/011,761, mailed Nov. 18, 2011, 12 pages.
Decision on Petition for Extension of Time in Reexamination (Granted), mailed Jan. 3, 2012, Reexamination Control No. 90/011,761, 3 pages.
Final Office Action with Interview Summary for Reexamination Control No. 90/011,761, mailed on Mar. 26, 2012, 17 pages.
Request for Inter Partes Reexamination for U.S. Patent No. 7,756,965 B1, filed Nov. 18, 2011, 189 pages.
Notice of Inter Partes Reexamination Request Filing Date and Notice of Assignment of Inter Partes Reexamination Request, mailed Dec. 1, 2011, Reexamination Control No. 95/001,827, 2 pages.
Order Granting Request for Inter Partes Reexamination of U.S. Patent No. 7,756,965 and Office Action, mailed Feb. 13, 2012, Reexamination Control No. 95/001,827, 18 pages.
Decision on Petition for Extension of Time in Reexamination (Granted), mailed Mar. 30, 2012, Reexamination Control No. 95/001,827, 3 pages.
Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Request for Reexamination of U.S. Patent No. 7,899,899, filed Jun. 27, 2011, 24 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.

(56) References Cited

OTHER PUBLICATIONS

Order Granting Request for Reexamination of U.S. Patent No. 7,899,899, mailed Aug. 19, 2011, Reexamination Control No. 90/011,760, 9 pages.
Office Action for Reexamination Control No. 90/011,760, mailed Nov. 18, 2011, 8 pages.
Decision on Petition for Extension of Time in Reexamination (Granted), mailed Jan. 5, 2012, Reexamination Control No. 90/011,760, 3 pages.
Final Office Action and Interview Summary for Reexamination Control No. 90/011,760, mailed Mar. 21, 2012, 14 pages.
Request for Inter Partes Reexamination for U.S. Patent No. 7,899,899 B1, filed Nov. 18, 2011, 153 pages.
Final Office Action for U.S. Appl. No. 11/707,697, mailed on Apr. 20, 2011, 10 pages.
Notice of Allowance for U.S. Appl. No. 11/707,697, mailed on Aug. 5, 2011, 9 pages.
Notice of Allowance for U.S. Appl. No. 11/707,697, mailed Aug. 12, 2011, 6 pages.
Non-Final Office Action for U.S. Appl. No. 12/635,371, mailed on Oct. 7, 2010, 44 pages.
Final Office Action for U.S. Appl. No. 12/635,371, mailed on Mar. 16, 2011, 7 pages.
Office Communication for U.S. Appl. No. 12/635,371, mailed on Mar. 24, 2011, 29 pages.
Non-Final Office Action for U.S. Appl. No. 12/635,371, mailed on Jun. 8, 2011, 9 pages.
Non-Final Office Action for U.S. Appl. No. 12/635,371, mailed on Feb. 15, 2012, 10 pages.
Non-Final Office Action for U.S. Appl. No. 10/214,921, mailed on Feb. 7, 2006, 7 pages.
Final Office Action for U.S. Appl. No. 10/214,921, mailed on Aug. 9, 2006, pages 10 pages.
Advisory Action for U.S. Appl. No. 10/214,921, mailed on Sep. 21, 2006, 3 pages.
Non-Final Office Action for U.S. Appl. No. 10/214,921, mailed on Dec. 7, 2006, 11 pages.
Final Office Action for U.S. Appl. No. 10/214,921, mailed on Aug. 13, 2007, 20 pages.
Non-Final Office Action for U.S. Appl. No. 10/214,921, mailed on Nov. 15, 2007, 23 pages.
Final Office Action for U.S. Appl. No. 10/214,921, mailed on Jun. 12, 2008, 21 pages.
Non-Final Office Action for U.S. Appl. No. 10/214,921, mailed on Oct. 6, 2008, 34 pages.
Notice of Allowance for U.S. Appl. No. 10/214,921, mailed on Apr. 3, 2009, 10 pages.
Request for Reexamination of U.S. Patent No. 7,574,508, filed Jun. 27, 2011, 21 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Order Granting Request for Reexamination of U.S. Patent No. 7,574,508, mailed Jul. 22, 2011, Reexamination Control No. 90/011,764, 15 pages.
Office Action for Reexamination Control No. 90/011,764, mailed on Nov. 14, 2011, 18 pages.
Office Action for Reexamination Control No. 90/011,764, mailed on Nov. 18, 2011, 18 pages.
Decision on Petition for Extension of Time in Reexamination (Granted), mailed Jan. 3, 2012, Reexamination Control No. 90/011,764, 3 pages.
Ex Parte Reexamination Interview Summary for Reexamination Control No. 90/011,764, mailed on Jan. 6, 2012, 52 pages.
Request for Inter Partes Reexamination of U.S. Patent No. 7,574,508, filed Nov. 4, 2011, 70 pages.
Notice of Inter Partes Reexamination Request Filing Date and Notice of Assignment of Inter Partes Reexamination Request, mailed Nov. 8, 2011, Reexamination Control No. 95/001,804, 2 pages.
Order Granting Request for Inter Partes Reexamination of U.S. Patent No. 7,574,508 and Office Action for Reexamination Control No. 95/001,804, mailed Dec. 8, 2011, 20 pages.
Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.
Non-Final Office Action for U.S. Appl. No. 12/506,137, mailed on Oct. 7, 2010, 26 pages.
Non-Final Office Action for U.S. Appl. No. 12/506,137, mailed on Nov. 23, 2011, 63 pages.
Non-Final Office Action for U.S. Appl. No. 10/674,627, mailed on Jun. 5, 2006, 11 pages.
Final Office Action for U.S. Appl. No. 10/674,627, mailed on Nov. 3, 2006, 16 pages.
Non-Final Office Action for U.S. Appl. No. 10/674,627, mailed on Jul. 30, 2007, 9 pages.
Final Office Action for U.S. Appl. No. 10/674,627, mailed on Apr. 11, 2008, 17 pages.
Non-Final Office Action for U.S. Appl. No. 10/674,627, mailed on Dec. 23, 2008, 18 pages.
Final Office Action for U.S. Appl. No. 10/674,627, mailed on Aug. 3, 2009, 17 pages.
Advisory Action for U.S. Appl. No. 10/674,627, mailed on Oct. 16, 2009, 3 pages.
Notice of Allowance for U.S. Appl. No. 10/674,627, mailed on Aug. 19, 2010, 4 pages.
Notice of Allowance for U.S. Appl. No. 10/839,919, mailed on Mar. 5, 2008, 17 pages.
Non-Final Office Action for U.S. Appl. No. 10/839,919, mailed on Jun. 18, 2008, 15 pages.
Final Office Action for U.S. Appl. No. 10/839,919, mailed on Dec. 9, 2008, 22 pages.
Notice of Allowance for U.S. Appl. No. 10/839,919, mailed on May 14, 2009, 19 pages.
Request for Reexamination of U.S. Patent No. 7,584,301, filed Jun. 27, 2011, 36 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Order Granting Request for Reexamination of U.S. Patent No. 7,584,301, mailed Aug. 8, 2011, Reexamination Control No. 90/011,765, 10 pages.
Office Action in Ex Parte Reexamination for Control No. 90/011,765, mailed on Oct. 13, 2011, 7 pages.
Ex Parte Reexamination Interview Summary for Reexamination Control No. 90/011,765, mailed on Nov. 29, 2011, 57 pages.
Third Party Requester's Opposition to Petition to Vacate, for Reexamination Control No. 95/001,807, filed Apr. 16, 2012, 17 pages.
Non-Final Office Action for U.S. Appl. No. 12/496,560, mailed on Sep. 17, 2010, 27 pages.
Final Office Action for U.S. Appl. No. 12/496,560, mailed on Jan. 28, 2011, 10 pages.
Notice of Allowance for U.S. Appl. No. 12/496,560, mailed on May 16, 2011, 11 pages.
Office Communication for U.S. Appl. No. 12/496,560, mailed on Jun. 14, 2011, 5 pages.
Non-Final Office Action for U.S. Appl. No. 12/272,618, mailed on Sep. 29, 2009, 16 pages.
Non-Final Office Action for U.S. Appl. No. 12/272,618, mailed on Feb. 4, 2010, 14 pages.
Final Office Action for U.S. Appl. No. 12/272,618, mailed on Nov. 26, 2010, 19 pages.
Non-Final Office Action for U.S. Appl. No. 12/272,618, mailed on Jun. 14, 2011, 13 pages.
Final Office Action for U.S. Appl. No. 12/272,618, mailed on Feb. 28, 2012, 12 pages.
Non-Final Office Action for U.S. Appl. No. 10/211,822, Mailed Aug. 19, 2005, 16 pages.

(56) References Cited

OTHER PUBLICATIONS

Notice of Allowance for U.S. Appl. No. 10/211,822, Mailed Mar. 7, 2006, 10 pages.
Non-Final Office Action for U.S. Appl. No. 10/377,364, mailed on Sep. 22, 2006, 18 pages.
Non-Final Office Action for U.S. Appl. No. 10/377,364, mailed on Mar. 26, 2007, 14 pages.
Non-Final Office Action for U.S. Appl. No. 10/377,364, mailed on Sep. 4, 2007, 13 pages.
Final Office Action for U.S. Appl. No. 10/377,364, mailed on Apr. 9, 2008, 15 pages.
Non-Final Office Action for U.S. Appl. No. 10/377,364, mailed on Nov. 24, 2008, 19 pages.
Final Office Action for U.S. Appl. No. 10/377,364, mailed on Aug. 31, 2009, 25 pages.
Advisory Action for U.S. Appl. No. 10/377,364, mailed on Nov. 23, 2009, 3 pages.
Notice of Allowance for U.S. Appl. No. 10/377,364, mailed on Jan. 12, 2010, 5 pages.
Non-Final Office Action for U.S. Appl. No. 11/429,177, mailed May 19, 2011, 87 pages.
Non-Final Office Action for U.S. Appl. No. 11/429,177, mailed Oct. 18, 2011, 25 pages.
Non-Final Office Action for U.S. Appl. No. 10/206,580, Mailed Aug. 15, 2005, 14 pages.
Final Office Action for U.S. Appl. No. 10/206,580, Mailed Mar. 9, 2006, 12 pages.
Advisory Action for U.S. Appl. No. 10/206,580, Mailed Jun. 6, 2006, 3 pages.
Non-Final Office Action for U.S. Appl. No. 10/206,580, Mailed Jul. 12, 2006, 8 pages.
Notice of Allowance for U.S. Appl. No. 10/206,580, Mailed Jan. 11, 2007, 17 pages.
Notice of Allowance for U.S. Appl. No. 10/206,580, Mailed Jul. 6, 2007, 5 pages.
Non-Final Office Action for U.S. Appl. No. 10/376,903, mailed on Jul. 17, 2006, 7 pages.
Final Office Action for U.S. Appl. No. 10/376,903, mailed on Jan. 12, 2007, 8 pages.
Non-Final Office Action for U.S. Appl. No. 10/376,903, mailed on Jun. 5, 2007, 13 pages.
Non-Final Office Action for U.S. Appl. No. 10/376,903, mailed on Feb. 20, 2008, 10 pages.
Final Office Action for U.S. Appl. No. 10/376,903, mailed on Oct. 16, 2008, 9 pages.
Non-Final Office Action for U.S. Appl. No. 10/376,903, mailed on Mar. 4, 2009, 8 pages.
Notice of Allowance for U.S. Appl. No. 10/376,903, mailed on Oct. 19, 2009, 4 pages.
Request for Reexamination of U.S. Patent No. 7,657,629, filed Jun. 27, 2011, 36 pages.
Notice of Reexamination Request Filing Date and Notice of Assignment of Reexamination Request, mailed Jul. 7, 2011, Reexamination Control No. 90/011,766, 2 pages.
Ex Parte Interview Summary for Reexamination Control No. 90/011,766, Jul. 14, 2011, 3 pages.
Order Granting Request for Reexamination of U.S. Patent No. 7,657,629, mailed Jul. 30, 2011, Reexamination Control No. 90/011,766, 10 pages.
Office Action for Reexamination Control No. 90/011,766, mailed on Oct. 4, 2011, 7 pages.
Ex Parte Reexamination Interview Summary for Reexamination Control No. 90/011,766, mailed on Nov. 29, 2011, 57 pages.
Decision on Petition for Extension of Time in Reexamination (Granted), mailed Dec. 2, 2011, Reexamination Control No. 90/011,766, 3 pages.
Request for Inter Partes Reexamination for U.S. Patent No. 7,657,629 B1, filed Nov. 17, 2011, 238 pages.
Notice of Inter Partes Reexamination Request Filing Date and Notice of Assignment of Inter Partes Reexamination Request, mailed Dec. 5, 2011, Reexamination Control No. 95/001,824, 2 pages.
Order Granting Request for Inter Partes Reexamination of U.S. Patent No. 7,657,629 and Office Action for Reexamination Control No. 95/001,824, mailed Jan. 12, 2012, 33 pages.
Third Party Requester's Comments under 35 U.S.C. § 314(B)(2) and 37 C.F.R. § 1.947, for Reexamination Control No. 95/001,824, filed Apr. 11, 2012, 21 pages.
Non-Final Office Action for U.S. Appl. No. 11/707,697, Mailed Mar. 3, 2009, 41 pages.
Requirement for Restriction/Election for U.S. Appl. No. 11/707,697, mailed on Sep. 17, 2009, 6 pages.
Final Office Action for U.S. Appl. No. 11/707,697, mailed on Jan. 12, 2010, 22 pages.
Office Action for U.S. Appl. No. 11/707,697, mailed on Nov. 22, 2010, 24 pages.
Advisory Action for Reexamination Control No. 90/011,761, mailed on Jul. 17, 2012, 11 pages.
Notification of Non-Compliant Appeal Brief, for Reexamination Control No. 90/011,761, mailed on Oct. 24, 2012, 4 pages.
Third Party Requester's Comments under 35 U.S.C. § 314(B)(2) and 37 C.F.R. § 1.947, for Reexamination Control No. 95/001,827, filed Jun. 13, 2012, 40 pages.
Third Party Requester's Refiling of Certificate of Service for Requester Comments, for Reexamination Control No. 95/001,827, filed Jun. 21, 2012, 3 pages.
Third Party Requester's Opposition to Petition to Refuse Entry of Requester's Comments, for Reexamination Control No. 95/001,827, filed Jul. 12, 2012, 5 pages.
Decision Dismissing Petitions, for Reexamination Control No. 95/001,827, mailed Aug. 22, 2012, 5 pages.
Advisory Action for Reexamination Control No. 90/011,760, mailed Jul. 17, 2012, 10 pages.
Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Patent No. 7,899,899 and Office Action for Reexamination Control No. 95/001,826, mailed Feb. 7, 2012, 19 pages.
Decision on Petition for Extension of Time in Reexamination (Granted), mailed Apr. 4, 2012, Reexamination Control No. 95/001,826, 3 pages.
Third Party Requester's Comments under 35 U.S.C. § 314(B)(2) and 37 C.F.R. § 1.947, for Reexamination Control No. 95/001,826, filed Jun. 6, 2012, 46 pages.
Third Party Requester's Refiling of Certificate of Service for Requester Comments, for Reexamination Control No. 95/001,826, filed Jun. 21, 2012, 3 pages.
Third Party Requester's Opposition to Petition to Refuse Entry of Requester's Comments, for Reexamination Control No. 95/001,826, filed Jul. 12, 2012, 5 pages.
Decision Dismissing Petitions, for Reexamination Control No. 95/001,826, mailed Aug. 22, 2012, 5 pages.
Non-Final Office Action for U.S. Appl. No. 13/023,292, mailed Jul. 8, 2011, 6 pages.
Notice of Allowance for U.S. Appl. No. 13/023,292, mailed Feb. 13, 2012, 85 pages.
Office Communication for U.S. Appl. No. 13/023,292, mailed Feb. 23, 2012, 11 pages.
Notice of Allowance for U.S. Appl. No. 13/023,292, mailed May 18, 2012, 25 pages.
Notice of Allowance for U.S. Appl. No. 13/023,292, mailed Jun. 4, 2012, 22 pages.
Office Communication for U.S. Appl. No. 13/023,292, mailed Jul. 2, 2012, 7 pages.
Office Communication for U.S. Appl. No. 13/023,292, mailed Aug. 24, 2012, 8 pages.
Non-Final Office Action for U.S. Appl. No. 13/595,952, mailed Nov. 13, 2012, 121 pages.
Non-Final Office Action for U.S. Appl. No. 10/924,552, Mailed Feb. 27, 2008, 14 pages.

(56) References Cited

OTHER PUBLICATIONS

Notice of Allowance for U.S. Appl. No. 10/924,552, Mailed May 30, 2008, 18 pages.
Non-Final Office Action for U.S. Appl. No. 12/177,021, mailed Jan. 29, 2010, 8 pages.
Final Office Action for U.S. Appl. No. 12/177,021, mailed Aug. 12, 2010, 20 pages.
Notice of Allowance for U.S. Appl. No. 12/177,021, mailed Dec. 10, 2010, 20 pages.
Non-Final Office Action for U.S. Appl. No. 13/008,321, mailed Nov. 20, 2012, 95 pages.
Non-Final Office Action for U.S. Appl. No. 12/916,390, mailed on Jul. 30, 2012, 45 pages.
Civil Action CV10-03428, Transcript of the Deposition of Kevin Delgadillo, taken Mar. 14, 2012, 12 pages.
Delgadillo, K., "Cisco DistributedDirector," posted Apr. 12, 1999, submitted as Exhibit 2 in *Brocade Communications Systems, Inc.* v. *A10 Networks, Inc.*, Civil Action CV10-03428, Mar. 21, 2012, 27 pages.
Delgadillo, K., "Cisco DistributedDirector," 1999, submitted as Exhibit 3 in *Brocade Communications Systems, Inc.* v. *A10 Networks, Inc.*, Civil Action CV10-03428, Mar. 21, 2012, 20 pages.
Declaration of James E. Mrose, entered as Exhibit Q in *Brocade Communications Systems, Inc.* v. *A10 Networks, Inc.*, Civil Action CV10- 03428, Mar. 21, 2012, 4 pages.
Information Disclosure Statement, filed Jul. 27, 1999 in the prosecution of U.S. Appl. No. 09/294,837, submitted as Exhibit A to the Mrose Declaration, 7 pages.
S. Ariyapperuma et al., "Security Vulnerabilities in DNS and DNS-SEC," Second International Conference on Availability, Reliability and Security (ARES '07), Apr. 2007, 8 pages.
Cisco Systems, Inc., "Configuring a DRP Server Agent," Jul. 6, 1999 (updated Oct. 11, 2006), 20 pages.
Office Action for U.S. Appl. No. 13/101,398, mailed on Jun. 11, 2012, 56 pages.
Civil Action 10-332—*Brocade Communication Systems, Inc.* v. *A10 Networks, Inc.* —Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiff's First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for Tro and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for Tro and Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and

(56) References Cited

OTHER PUBLICATIONS

Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).

Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.

Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.

Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.

Civil Action CV10-03428—Order Denying Motion for Temporary Restraining Order [Redacted Version] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.

Civil Action CV10-03428—Notice of Granted Request for Reexamination of U.S. Patent No. 7,581,009, filed Sep. 27, 2011, 18 pages.

Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.

Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.

Civil Action CV10-034286—Notice of Motion for Partial Summary Judgment on Assignor Estoppel, filed by Brocade Communications Systems, Inc., Foundry Networks, LLC, filed Oct. 11, 2011, 21 pages.

Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.

Civil Action CV10-03428—Initial Claim Construction Brief, filed by Brocade Communications Systems, Inc., Foundry Networks, LLC, filed Oct. 11, 2011, 31 pages.

Civil Action CV10-03428—Declaration of Nitin Gambhir of Brocade Communications, Inc. and Foundry Networks, LLC's Motion for Summary Judgment of Infringement of U.S. Patent No. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.

Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.

Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.

Civil Action CV10-03428—Declaration of Nitin Gambhir in Support of Brocade Communications, Inc. and Foundry Networks, LLCs Motion for Summary Judgment of Infringement of U.S. Pat. No. 7,454,500; 7,581,009; 7,657,629; 7,584,301; and 7,840,678, filed by Brocade Communications Systems, Inc., Foundry Networks, LLC, filed Oct. 21, 2011, 162 pages.

Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.

Civil Action CV10-03428—Responsive Claim-Construction Brief (PLR 4-5(b)) by A10 Networks, Inc., Lee Chen, Rajkumar Jalan, filed Nov. 15, 2011, 28 pages.

Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.

Civil Action CV10-03428—Declaration of J. Douglas Tygar, Ph.D. In Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.

Civil Action CV10-03428—Opposition re Motion for Summary Judgment of Noninfringement of U.S. Patent No. 5,875,185; Motion for Partial Summary Judgment of U.S. Patent No. 7,454,500; 7,581,009; 7,657,629; 7,584,301; and 7,840,678, filed by A10 Networks, Inc., Lee Chen, Rajkumar Jalan, filed Nov. 15, 2011, 20 pages.

Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. and Foundry Networks, LLCs Motion for Partial Summary Judgment of U.S. Patent No. 7,454,500; 7,581,009; 7,657,629; 7,584,301; and 7,840,678 filed by A10 Networks, Inc., Lee Chen, Rajkumar Jalan, filed Nov. 15, 2011, 16 pages.

Civil Action CV10-03428—Administrative Motion to Consider Whether Cases Should be Related, filed by Brocade Communications Systems, Inc., Foundry Networks, LLC, filed Nov. 21, 2011, 8 pages. Included: Declaration and Proposed Order.

Civil Action CV10-03428—Reply Claim Construction Brief filed by Brocade Communications Systems, Inc., Foundry Networks, LLC, filed Nov. 22, 2011, 22 pages.

Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.

Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.

Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages. Included: Exhibits 1 through 6.

Civil Action CV10-03428—Litigation Docket, printed on Nov. 26, 2011, 2011, 44 pages.

Civil Action CV10-03428—Stipulation Regarding Plaintiffs' Motion for Partial Summary Judgment of Assignor Estoppel, filed Nov. 30, 2011, 2 pages.

Civil Action CV10-03428—Brocades Opposition to Defendant's Motion to Stay Proceedings Pending Reexaminations, filed Dec. 7, 2011, 18 pages.

Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.

(56) References Cited

OTHER PUBLICATIONS

Civil Action CV10-03428—Defendant and Counterclaimant A10 Networks, Inc.'s Notice of Granted Requests for Inter Partes Reexamination of Plaintiffs' U.S. Patent No. 7,558,195; 7,454,500; 7,574,508; and 7,720,977, filed Dec. 28, 2011, 3 pages.
Civil Action CV10-03428—Defendant and Counterclaimant A10 Networks, Inc.'s Notice of Granted Request for Inter Partes Reexamination of Plaintiffs' U.S. Patent No. 7,581,301, filed Dec. 29, 2011, 3 pages.
Civil Action CV10-03428—Defendant and Counterclaimant A10 Networks, Inc.'s Notice of Granted Request for Inter Partes Reexamination of Plaintiffs' U.S. Patent No. 7,657,629 and 7,840,678, filed Jan. 20, 2012, 3 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent No. 7,774,833; 7,647,427; 7,716,370; 7,581,009); and (ii) Status Updated for Eleven Already-Instituted Reexaminations (U.S. Patent No. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.
Civil Action CV10-03428—Defendant and Counterclaimant A10 Networks, Inc.'s Notice of Granted Request for Inter Partes Reexamination of Plaintiffs' U.S. Patent No. 7,756,965 and Status Update, filed Feb. 16, 2012, 3 pages.
Civil Action CV10-03428—Defendant and Counterclaimant A10 Networks, Inc.'s Notice of Requests for Reexaminations Granted re Patents 7,558,195; 7,657,629; and 7,840,678, filed Aug. 5, 2011, 3 pages.
Civil Action CV10-03428—Defendant and Counterclaimant A10 Networks, Inc.'s Notice of Granted Requests for Reexamination for Patent 7,584,301, filed Aug. 12, 2011, 3 pages.
Civil Action CV10-03428—Defendant and Counterclaimant A10 Networks, Inc.'s Motion for Summary Judgment of Noninfringement of U.S. Patent No. 7,647,427 and 7,716,370, filed Oct. 11, 2011, 14 pages.
Civil Action CV10-03428—Declaration of John Chiong in Support of Defendant and Counterclaim-Plaintiff A10 Networks, Inc.'s and Defendants Lee Chen's and Rajkumar Jalan's Motion for Summary Judgment of Noninfringement of U.S. Patent No. 7,647,427 and 7,716,370, filed Oct. 11, 2011, 3 pages.
Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Patent No. 7,647,427 and 7,716,370, filed Oct. 11, 2011, 3 pages.
Civil Action CV10-03428—Declaration of Nitin Gambhir in Support of Brocade Communications Systems, Inc.'s and Foundry Networks, LLC's (1) Motion for Partial Summary Judgment of Infringement of U.S. Patent No. 7,647,427 and 7,716,370 [Filed Under Seal]; (2) Opposition to Defendants' Motion for Summary Judgment of Non-Infringement of U.S. Patent No. 7,647,427 and 7,716,370 [Filed Under Seal]; and (3) Opposition to Defendants' Motion for Summary Judgment of Non-Infringement of U.S. Patent No. 7,558,195 [Filed Under Seal], filed Nov. 8, 2011, 153 pages.
Civil Action CV10-03428—Defendant and Counterclaimant A10 Networks, Inc.'s Reply in Support of Motion for Summary Judgment of U.S. Patent No. 7,647,427 and 7,716,370, filed Nov. 22, 2011, 17 pages.
Civil Action CV10-03428—Declaration of Siddhartha M. Venkatesan in Support of Opposition to Motion to Stay Proceedings Pending Reexaminations, filed Dec. 7, 2011, 3 pages.
Civil Action CV10-03428—Declaration of Azer Bestavros in Support of Brocade's Claim Construction Brief, filed Oct. 20, 2011, 24 pages.
Civil Action CV10-03428—Declaration of Izhak Rubin in Support of Brocade Communications Systems, Inc.'s and Foundry Networks, LLC's: (1) Claim Construction Brief; (2) Opposition to Defendants' Motion for Summary Judgment of Non-Infringement of U.S. Patent No. 7,647,427 and 7,716,370; and (3) Opposition to Defendants'

Motion for Summary Judgment of Non-Infringement of U.S. Patent No. 7,558,195, filed Nov. 18, 2011, 34 pages.
Civil Action CV10-03428—Order by Judge Lucy H. Koh Denying A10's Motion for Summary Judgment of Nonlnfringement; Granting Brocade's Motion for Summary Judgment of Nonlnfringement, issued Jan. 6, 2012, 20 pages.
Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.
Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.
Civil Action CV10-03428—Order by Hon. Lucy H. Koh granting Motion for Leave to File "Notice of Acticity Before the Patent Office From the Ongoing Inter Partes and Ex Parte Reexaminations of the Asserted Brocade Patents," issued Mar. 15, 2012, 5 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Motion for Summary Judgment, filed Apr. 13, 2012, 223 pages.
Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Patent No. 7,454,500; 7,581,009; 7,55,195; and 7,774,833, filed May 3, 2012, 23 pages.
Civil Action CV10-03428—Exhibit 17 to Declaration of Scott R. Mosko in Support of Defendants A10 Networks, Inc.'s, Lee Chen's, Rajkumar Jalan's, Ron Szeto's and Steve Hwang's Motion for Summary Judgment, filed May 4, 2012, 25 pages.
Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.
Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.
Civil Action CV10-03428—Plaintiff's Objections to Declarations Submitted by A10 Networks, Inc., Lee Chen, Rajkumar Jalan, Ron Szeto and Steve Hwang in Support of Their Motion for Partial Summary Judgment, filed May 17, 2012, 3 pages.
Civil Action CV10-03428—Declaration of Elizabeth C. McBride in Support of Plaintiffs Brocade Communications Systems, Inc.'s and Foundry Networks, LLC's Opposition to Defendants' Motion for Summary Judgment, filed May 17, 2012, 135 pages.
Civil Action CV10-03428—Declaration of Gary Hemminger in Support of Brocade Communications Systems, Inc.'s and Foundry Networks, LLC's Opposition to Defendants A10 Networks, Inc.'s, Lee Chen's, Rajkumar Jalan's, Ron Szeto's and Steve Hwang's Motion for Summary Judgment, filed May 17, 2012, 3 pages.
Civil Action CV10-03428—Defendants A10 Networks, Inc.'s, Lee Chen's, Rajkumar Jalan's, Ron Szeto's and Steve Hwang's Opposition to Plaintiffs Motion for Partial Summary Judgment Dismissing Invalidity Declaratory Relief Counterclaim and Invalidity Defense Regarding U.S. Patent No. 7,454,500, 7,581,009; 7,558,195; and 7,774,833, filed May 17, 2012, 30 pages.
Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiffs Motion for Partial Summary Judgment Dismissing Invalidity Declaratory Relief Counterclaim and Invalidity Defense Regarding U.S. Patent No. 7,454,500; 7,581,009; 7,558,195; and 7,774,833, filed May 17, 2012, 13 pages.
Devarapalli et al., U.S. Appl. No. 61/393,796, filed Oct. 15, 2010.
Joshi et al., U.S. Appl. No. 13/229,380, filed Sep. 9, 2011.
Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

(56) References Cited

OTHER PUBLICATIONS

Cisco Document, "Configuring the CSS Domain Name Service," posted on Dec. 2000, Cisco Systems Inc., http://www.ciscosystems.com, pp. 1-13.

Doeringer et al., "Routing on Longest-Matching Prefixes," IEEE/ACM Transactions on Networking, vol. 4, No. 1, Feb. 1996, pp. 86-97.

F5 Networks, Inc., "Keeping Up with Multi-Service Applications," A F5 Networks, Inc. White Paper Document, Jan. 2006, 8 pages, Seattle, WA.

Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.

F5 Networks, Inc., "Optimize Application Delivery Across Your Globally Distributed Data Centers," BIG-IP Global Traffic Manager Datasheet, 2009, 8 pages, Seattle WA.

Stalvig P., "Disaster Recovery: Not Just Planning for the Worst," A F5 Networks, Inc. White Paper Document, 2008, 16 pages, F5 Networks, Inc., Seattle, WA.

Cisco Systems, Inc., "The Global Server Load Balancing Primer," A Cisco Systems, Inc. White Paper Document, 1992-2004, 20 pages, San Jose, CA.

Civil Action 10-332, Complaint for Patent Infringement with Exhibits A-G, filed on Apr. 23, 2010, 131 pages.

Civil Action 10-332, Second Amended and Supplemental Complaint for Patent Infringement with Exhibits H-I, filed on Jul. 16, 2010, 41 pages.

Civil Action CV10-03443, Complaint for Declaratory Judgment with Exhibits A-I, filed on Aug. 6, 2010, 153 pages.

Network Working Group, Request for Comments (RFC) 4033, "DNS Security Introduction and Requirements," Mar. 2005, 22 pages.

Network Working Group, Request for Comments (RFC) 4034, "Resource Records for the DNS Security Extensions," Mar. 2005, 31 pages.

Network Working Group, Request for Comments (RFC) 4035, "Protocol Modifications for the DNS Security Extensions," Mar. 2005, 55 pages.

National Institute of Standards and Technology (NIST), "Secure Domain Name System (DNS) Deployment Guide," Special Publication 800-81, May 2006, 103 pages.

CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.

Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.

Silva, Peter, "DNSSEC: The Antidote to DNS Cache Poisoning and Other DNS Attacks," A F5 Networks, Inc. Technical Brief, 2009, 10 pages, Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.

A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.

Civil Action 10-332, Report on the Filing or Determination of an Action Regarding a Patent or Trademark, filed on Aug. 5, 2010, 2 pages.

Civil Action 10-332, Notice of Voluntary Dismissal Without Prejudice, filed on Aug. 5, 2010, 2 pages.

Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.

Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.

Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.

Civil Action CV10-03428, Answer to Third Amended Complaint, Affirmative Defenses, and Counterclaims, filed on May 16, 2011, 40 pages.

Civil Action CV10-03428, Answer to Defendant A10 Networks, Inc.'s Counterclaims, and Counterclaim, filed on May 27, 2011, 12 pages.

Delgadillo, K., "Cisco Distributed Director," Cisco White Paper, 1999, 19 pages.

Table of Contents for 2nd Conference on Telecommunications (ConfTele'99), Apr. 15-16, 1999, 9 pages.

Bernardo, L. et al., "Scalability Issues in Telecommunication Services," in Proceedings of 2nd Conference on Telecommunications (ConfTele'99), Apr. 15-16, 1999, pp. 409-413.

Lin, "VPN Tunnel Balancer," U.S. Appl. No. 60/169,502, filed Dec. 7, 1999, 7 pages.

Cisco Systems, Inc., "Cisco LocalDirector Version 1.6.3 Release Notes," Oct. 1997, 52 pages, San Jose, CA.

Foundry Networks, Inc., "Foundry ServerIron Installation and Configuration Guide," May 2000, 784 pages.

Dell Computer Corporation, "3-DNS Reference Guide, Version 4.2," 2002, 261 pages.

Schemers III, "lbnamed: A Load Balancing Name Server in Perl," 1995 LISA IX, Sep. 17-22, 1995, Monterey, CA, 13 pages.

Goldszmidt, "Load Distribution for Scalable Web Servers: Summer Olympics 1996," In Proceedings of the 8th IFIP/IEEE International Workshop on Distributed Systems: Operations and Management, Sydney, Australia, Oct. 1997, 10 pages.

"Use F5 Networks' 3DNS Controller to Supercharge Standard DNS Capabilities," Jul. 1999, F5 White Paper, Seattle, WA.

Buyya, "High Performance Cluster Computing: Architectures and Systems," vol. 1, copyright 1999, Prentice Hall PTR, Upper Saddle River, New Jersey 07458, http://www.phptr.com.

Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.

Civil Action CV10-03428—Notice of Granted Requests for Reexamination of Patents 7,547,508 and 7,270,977, Filed Aug. 1, 2011, 31 pages, including Exhibits A and B.

Civil Action CV10-03428—Notice of Granted Requests for Reexamination of Patents 7,558,195, 7,657,629, 7,840,678, Filed Aug. 5, 2011, 316 pages.

Civil Action CV10-03428—Notice of Granted Requests for Reexamination of Patent 7,584,301, Filed Aug. 12, 2011, 14 pages, including Exhibit A.

Civil Action CV10-03428—Joint Claim Construction, Filed Aug. 26, 2011, 29 pages.

Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages, including Exhibits A through F.

Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.

(56) References Cited

OTHER PUBLICATIONS

Skene et al., "Method and System for Balancing Load Distribution on a Wide Area Network," U.S. App. No. 09/459,815, filed Dec. 13, 1999, 59 pages.
Skene et al., "Method and System for Name Server Load Balancing," U.S. Appl. No. 60/182,812, filed Feb. 16, 2000, 16 pages.
Tsimelzon et al., "Java application framework for an internet content delivery network," U.S. Appl. No. 60/347,481, filed Jan. 11, 2002, 26 pages.
"Foundry Networks Announces Application Aware Layer 7 Switching on ServerIron Platform," Mar. 1999, 4 pages.
Civil Action CV10-03428, Order Construing Disputed Claim Terms of U.S. Patent No. 7,647,427; 7,716,370; 7,558,195; 7,454,500; 7,581,009; 7,657,629; 7,584,301; 7,840,678; and 5,875,185, issued Jan. 6, 2012, 33 pages.
Information Disclosure Statement filed on Apr. 4, 2004 for U.S. Patent No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC'10), 2010, 7 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Non-Final Office Action for U.S. Appl. No. 09/670,487, Mailed Dec. 31, 2003, 22 pages.
Final Office Action for U.S. Appl. No. 09/670,487, Mailed Sep. 21, 2004, 22 pages.
Non-Final Office Action for U.S. Appl. No. 09/670,487, Mailed Mar. 15, 2005, 18 pages.
Final Office Action for U.S. Appl. No. 09/670,487, Mailed Nov. 3, 2005, 17 pages.
Non-Final Office Action for U.S. Appl. No. 09/670,487, Mailed May 3, 2006, 18 pages.
Non-Final Office Action for U.S. Appl. No. 09/670,487, Mailed Nov. 17, 2006, 8 pages.
Final Office Action for U.S. Appl. No. 09/670,487, Mailed Oct. 30, 2007, 9 pages.
Non-Final Office Action for U.S. Appl. No. 09/670,487, Mailed Jul. 22, 2008, 6 pages.
Notice of Allowance for U.S. Appl. 09/670,487, Mailed Sep. 18, 2008, 4 pages.
Request for Reexamination of U.S. Patent No. 7,454,500, filed Jun. 27, 2011, 29 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Order Granting Request for Reexamination of U.S. Patent No. 7,454,500, mailed Aug. 12, 2011, Reexamination Control No. 90/011,772, 11 pages.
Office Action for Reexamination Control No. 90/011,772, mailed Oct. 13, 2011, 8 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Nov. 29, 2011, 58 pages.
Ex Parte Reexamination Interview Summary for Reexamination Control No. 90/011,772, mailed on Apr. 10, 2012, 3 pages.
Final Office Action for Reexamination Control No. 90/011,772, mailed May 17, 2012, 53 pages.
Request for Inter Partes Reexamination of U.S. Patent No. 7,454,500, filed Nov. 4, 2011, 157 pages.
Notice of Assignment of Inter Partes Reexamination Request and Notice of Reexamination Request Filing Date, mailed Nov. 18, 2011, Reexamination Control No. 95/001,806, 2 pages.
Order Granting Request for Inter Partes Reexamination of U.S. Patent No. 7,454,500 and Office Action for Reexamination Control No. 95/001,806, mailed Dec. 16, 2011, 43 pages.
Third Party Requester's Opposition to Petition to Vacate, for Reexamination Control No. 95/001,806, filed Mar. 1, 2012, 15 pages.
Third Party Requester's Opposition to Petition to Suspend Reexamination for Reexamination Control No. 95/001,806, filed Mar. 2, 2012, 14 pages.
Third Party Requester's Comments under 35 U.S.C. § 314(B)(2) and 37 C.F.R. § 1.947, for Reexamination Control No. 95/001,806, filed Mar. 19, 2012, 36 pages.
Third Party Requester's Opposition to Patent Owner's Petition to "Supplement," for Reexamination Control No. 95/001,806, filed Apr. 19, 2012, 21 pages.
Non-Final Office Action for U.S. Appl. No. 11/741,480, Mailed Nov. 27, 2007, 5 pages.
Non-Final Office Action for U.S. Appl. No. 11/741,480, Mailed Apr. 29, 2008, 6 pages.
Final Office Action for U.S. Appl. No. 11/741,480, Mailed Oct. 31, 2008, 10 pages.
Notice of Allowance for U.S. Appl. No. 11/741,480, Mailed Apr. 10, 2009, 7 pages.
Terminal Disclaimer for U.S. Appl. No. 11/741,480, filed Jan. 29, 2008, 1 page.
Request for Reexamination of U.S. Patent No. 7,581,009, filed Jun. 27, 2011, 58 pages.
Notice of Reexamination Request Filing Date and Notice of Assignment of Reexamination Request, mailed Jul. 8, 2011, Reexamination Control No. 90/011,770, 2 pages.
Ex Parte Reexamination Interview Summary, for Reexamination Control No. 90/011,770, mailed Jul. 18, 2011, 2 pages.
Order Granting Request for Reexamination of U.S. Patent No. 7,581,009, mailed Sep. 21, 2011, Reexamination Control No. 90/011,770, 14 pages.
Office Action for Reexamination Control No. 90/011,770, mailed Feb. 16, 2012, 35 pages.
Ex Parte Reexamination Interview Summary, for Reexamination Control No. 90/011,770, mailed Mar. 27, 2012, 3 pages.
Decision on Petition for Extension of Time in Reexamination (Granted), mailed Mar. 28, 2012, Reexamination Control No. 90/011,770, 3 pages.
Request for Inter Partes Reexamination of U.S. Patent No. 7,581,009, filed Nov. 4, 2011, 197 pages.
Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Patent No. 7,581,009 and Office Action for Reexamination Control No. 95/001,807, mailed Jan. 31, 2012, 23 pages.
Decision on Petition for Extension of Time in Reexamination (Granted), mailed Mar. 30, 2012, Reexamination Control No. 95/001,807, 3 pages.
Hasenstein, Michael, "IP Address Translation", http://www.csn.tu-chemnitz.de/HyperNews/get/linux-ip-nat.html, 1997, 50 pages.
Hasenstein, Michael, "Linux IP Network Address Translation", http://web.archive.org/web/20031209024748/http://www.hasenstein.com/HyperNews/get/linux-tp-nat.html, Dec. 2003, 12 pages.
Venkataramani, Arun et al., "A mechanism for background transfers", Proceedings of the fifth symposium an operating systems design and implementation (OSDI'02), 2002, ISBN: 1-931971-06-4, Publisher: USENIX Assoc, Berkeley, CA, USA, Laboratory of Advanced Systems Research, Department of Computer Science, 19 pages.

(56) References Cited

OTHER PUBLICATIONS

Zhou, Tao, "Web Server Load Balancers", http://windowsitpro.com/print/networking/web-server-load-balancers, Feb. 29, 2000, 7 pages.

Bourke, Tony, "Server Load Balancing", Server Load Balancing, 2001, O'Reilly & Associates, Inc., Published by O'Reilly & Associates Inc., 101 Morris Street, Sebastopol CA 95472, Printed Aug. 2001, First Edition, 182 pages.

* cited by examiner

DISTRIBUTED HEALTH CHECK FOR GLOBAL SERVER LOAD BALANCING

CROSS-REFERENCE TO RELATED APPLICATION

The present application is a continuation-in-part of U.S. application Ser. No. 09/670,487, entitled "GLOBAL SERVER LOAD BALANCING," filed Sep. 26, 2000, assigned to the same assignee as the present application, and which is incorporated herein by reference its entirety.

BACKGROUND OF THE INVENTION

1. Field of the Invention

This disclosure relates generally to load balancing among servers. More particularly but not exclusively, the present disclosure relates to achieving load balancing by, in response to resolving a DNS query by a client, providing the address of a server that is expected to serve the client with a high performance in a given application, based at least in part on remotely obtained health check information.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. For instance, the authoritative DNS does not detect a server that is down. Consequently, the authoritative DNS server continues to return a disabled host server's IP address until an external agent updates the authoritative DNS server's resource records. Further, the conventional DNS algorithm allows invalid IP addresses (e.g., that corresponding to a downed server) to persist in a local DNS server until the TTL for the invalid IP address expires.

SUMMARY OF THE INVENTION

One aspect of the present invention provides a system to balance load among host servers. The system includes an authoritative domain name server, and a load balance switch coupled to the authoritative domain name server as a proxy to the authoritative domain name server. A plurality of site switches are communicatively coupled to the load balance switch and remote from the load balance switch. At least one of the site switches can obtain health check information indicative of health status of ports associated with host servers for that site switch and can provide the obtained health check information to the load balance switch, to allow the load balance switch to arrange a list of network addresses from the authoritative domain name server based at least in part on the health check information provided by the site switch.

DETAILED DESCRIPTION

Figure 1:
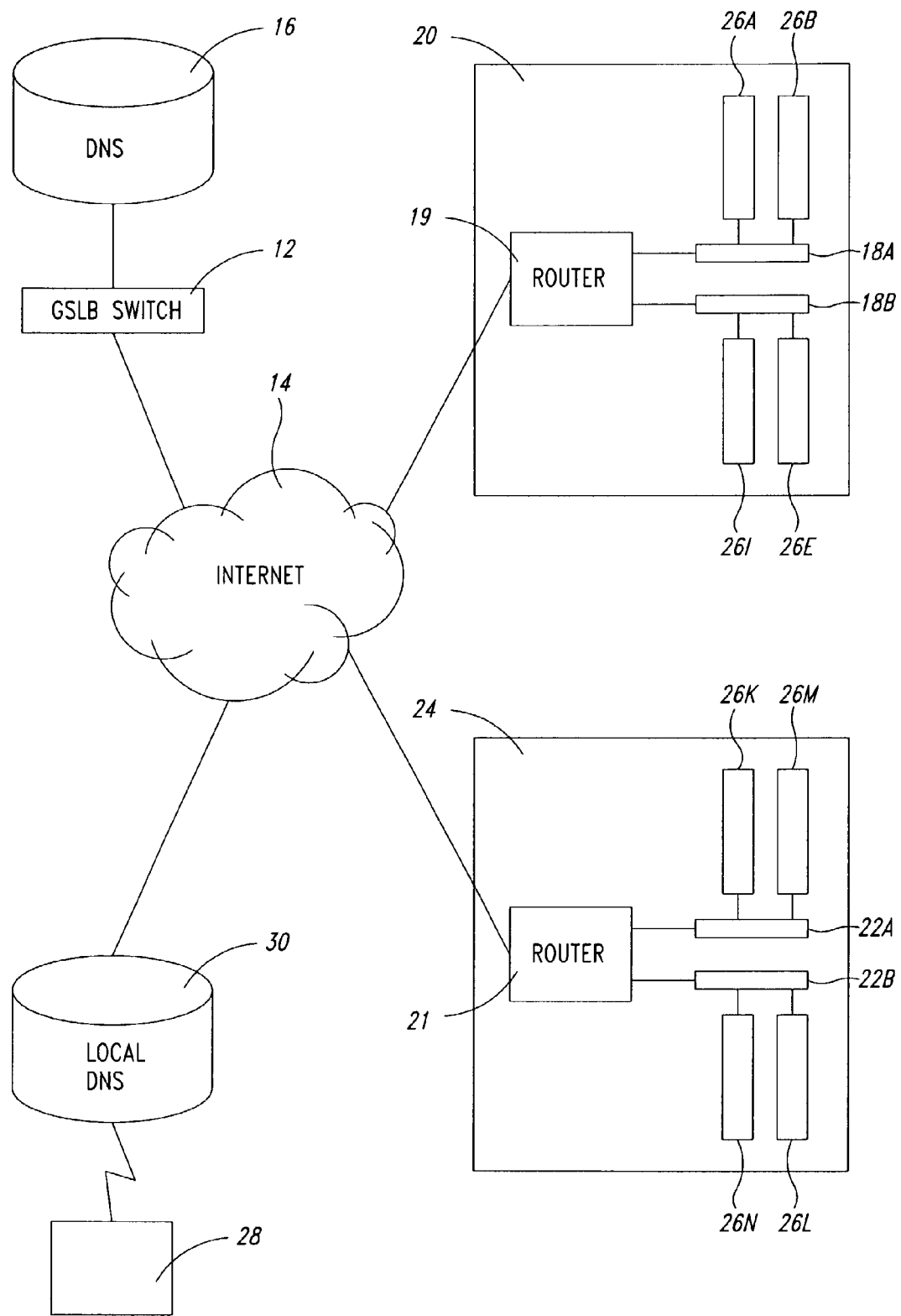
FIG. 1 illustrates a global server load-balancing configuration in which one embodiment of the invention may be implemented.

Embodiments for global server load-balancing techniques that are based at least in part on distributed health check information are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a global server load-balancing (GSLB) switch that serves as a proxy to an authoritative DNS and that communicates with numerous site switches coupled to host servers serving specific applications. The GSLB switch receives, from the site switches, operational information regarding host servers being load balanced by the site switches. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

One of these metrics includes health check information, which is indicative of the host servers' health. In the prior-filed U.S. application Ser. No. 09/670,487, entitled "GLOBAL SERVER LOAD BALANCING," filed Sep. 26, 2000 and U.S. application Ser. No. 10/206,580, entitled "GLOBAL SERVER LOAD BALANCING," filed Jul. 25, 2002, embodiments were disclosed where the GSLB switch carried out health checks in a "centralized manner." That is, to determine the health of the servers and/or the health of the host application(s) on the servers, the GSLB switch sends Layer 4 transmission control protocol (TCP) or User Datagram Protocol (UDP) health checks to the servers. Layer 3 and Layer 7 health checks can also be sent. If a server fails one of these health checks, it is disqualified from being the "best" IP address.

In contrast to the centralized health check, an embodiment of the present invention performs distributed health checks, where the health-checking tasks are distributed to the peer metric agents at the site switches, instead of being performed by the GSLB switch. The health checking may thus be performed independently of a request from the GSLB switch, in contrast to the centralized health check implementation where the health check information is conveyed in response to a request from the GSLB switch. The distributed health checking allows for reduction in GSLB processing load, reduction in health-check traffic, and increased scalability due to the distribution. Each metric agent generates a health status report, and provides this report to the GSLB switch (such as via part of a protocol message in one embodiment). On receiving the health status report, the GSLB switch processes the health check information therein, updates its records accordingly, and uses the health information to evaluate or modify the DNS response. The health check information may be indicative of access conditions to host servers (including host servers associated with a particular site switch, or with host servers that are not associated with a particular site switch, if that site switch operates as a type of information collector, for instance), and/or the health check information may be indicative of access conditions to an application hosted on a host server or access condition to some other component for which a particular site switch collects health check information.

An embodiment of the invention also allows integration of distributed health check components in systems that also include non-distributed health check components (e.g., centralized health check components). For example, a system described herein includes a GSLB switch and at least one remote metric agent that both support distributed health checks. Embodiments of the distributed health check can also provide compatibility between a remote metric agent that supports distributed health checks and a GSLB switch that does not, or compatibility between a GSLB switch that supports distributed health checks and a remote agent that does not. In situations where both a GSLB switch and a remote agent do not support distributed health checks, a centralized health check (such as disclosed in the co-pending applications identified above) can be implemented. This compatibility allows interoperability, installation, and transition of the distributed health check components into current systems that are based on centralized health checks.

FIG. 1 illustrates an example global server load-balancing configuration in which one embodiment of the invention may be implemented. As shown in FIG. 1, global server load balancing (GSLB) switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet for the authoritative DNS server of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc. of San Jose, Calif.

FIG. 1 also shows client program 28 connected to Internet 14, and communicates with local DNS server 30. When a browser on client program 28 requests a web page, for example, using a Universal Resource Locator (URL), such as http://www.foundrynet.com/index.htm, a query is sent to local DNS server 30 to resolve the symbolic host name www.foundrynet.com to an IP address of a host server. The client program 28 receives from DNS server 30 a list of IP addresses corresponding to the resolved host name. This list of IP addresses is either retrieved from local DNS server's 30 cache, if the TTL of the responsive IP addresses in the cache has not expired, or obtained from GSLB switch 12, as a result of a recursive query. Unlike the prior art, however, this list of IP addresses is re-ordered in one embodiment by GSLB switch 12 based on performance metrics described in further detail below, one of which is associated with distributed health check information.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client program 28 and returns the IP address list with a virtual IP address configured at that site switch placed at the top. (Within the scope of the present invention, other forms of ranking or weighting the IP addresses in the list can also be possible.) Client program 28 can receive the ordered list of IP addresses, and typically selects the first IP address on the list to access the corresponding host server.

Figure 3:
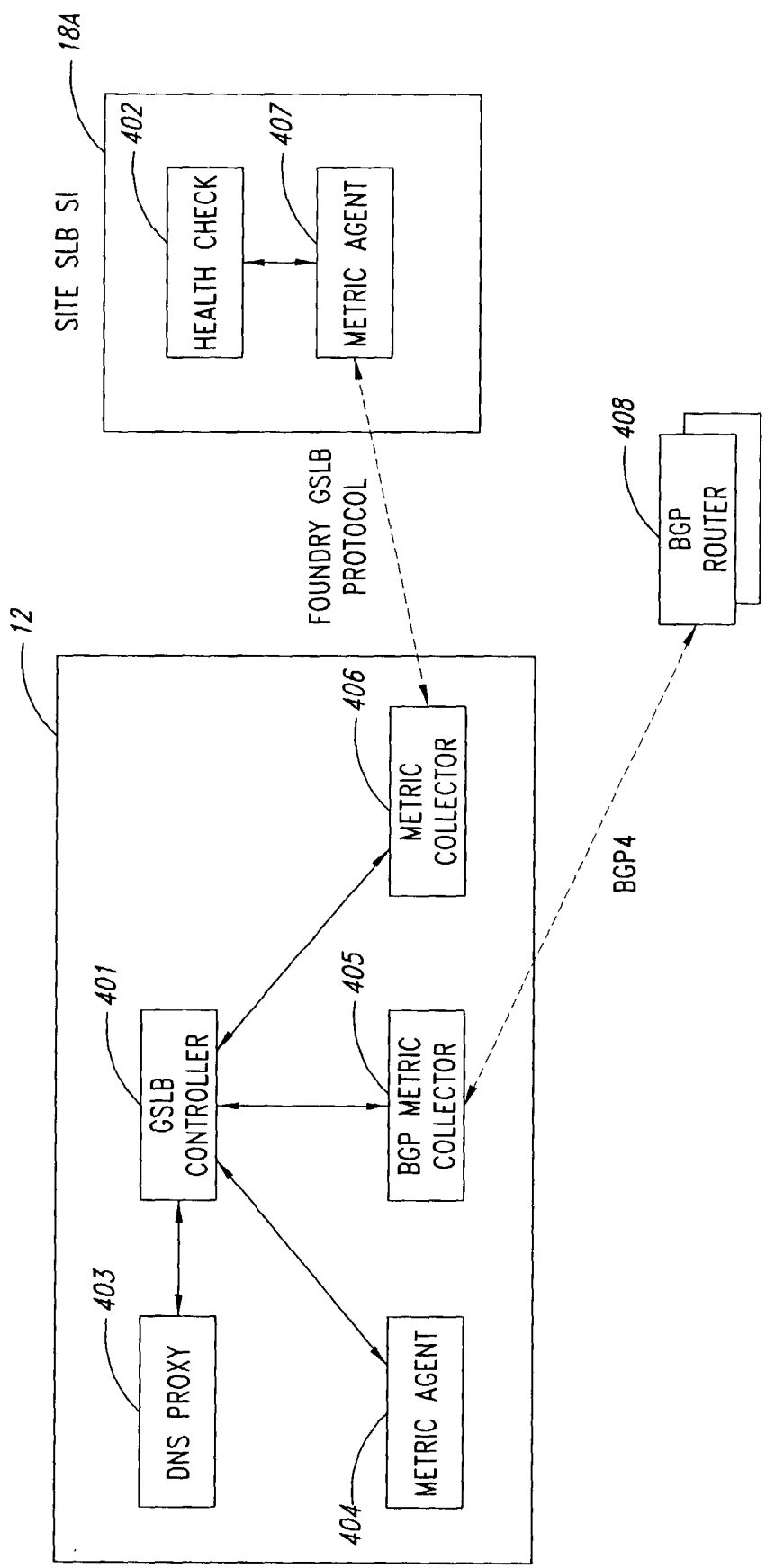
FIG. 3 is a block diagram showing the functional modules of a GSLB switch and a site switch relevant to distributed health checking for the global server load balancing function in accordance with one embodiment of the invention.

FIG. 3 is a block diagram showing the functional modules of GSLB switch 12 and site switch 18A relevant to the global server load balancing function. For purposes of illustration, the site switch 18A is chosen—it is appreciated that the discussion herein can be appropriately applied to any of the other site switches depicted in FIG. 1. As shown in FIG. 3, GSLB switch 12 includes a GSLB switch controller 401, DNS proxy module 403, metric agent 404, routing metric collector 405, and metric collector 406. GSLB switch controller 401 provides general control functions for the operation of GSLB switch 12. The metric collector 406 communicates with metric agents in site switches (e.g., FIG. 3 shows metric collector 406 communicating with a remote metric agent 407 of a site server load balancing ServerIron or "SLB SI") to collect switch-specific metrics from each of these switches, which in one embodiment includes health check information.

At the site switch 18A, the remote metric agent 407 is communicatively coupled to a health check module 402. The health check module 402, in a distributed health check embodiment, is responsible for querying host servers and relevant applications hosted on the host servers being load balanced by the site switch 18A to determine the "health" of each host server and each relevant application. In one embodiment, the health information includes a list of VIPs configured at the remote site 18A (e.g., at that SLB SI) and whether the ports associated with these VIPs are up or down. Once this health information is obtained by the health check module 402 (which may be implemented as a software module), the health information is communicated to the remote metric agent 407, which then sends the health information to the metric collector 406 via a protocol message and in a manner that will be described later below.

In a centralized health check embodiment, such as described in the co-pending applications identified above, the health check module 402 is located at the GSLB switch 12, rather than at the site switch 18A. In this implementation, the health check module 402 communicates directly with the GSLB switch controller 401, rather than via protocol messages. Similarly, the local metric agent 404 can communicate health check information to the GSLB switch controller 401 directly, without using the protocol communication.

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to an embodiment of the present invention, using the metrics collected by routing-metric collector 405 and metric collector 406, and values of any other relevant parameter, and (e) provides the ordered list of IP addresses to the requesting DNS server. It is appreciated that the GSLB switch controller 401 may alternatively or in addition perform the IP address-ordering based on the metrics. Since GSLB switch 12 can also act as a site switch, GSLB switch 12 is provided a local metric agent 404 for collecting metrics. Similar to that in the centralized health check embodiment, the local metric agent 404 communicates health check information to the GSLB switch controller 401 directly, without using the protocol communications of the distributed health check embodiment.

In one embodiment, the metrics used in a GSLB switch 12 include (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), for implementations that perform centralized health checks rather than distributed health checks, and (h) a policy called the "Least Response Selection" (LRS) which prefers the site switch that has been selected less often than others.

Many of these performance metrics can be provided default values. The order in which these performance metrics can be used to evaluate the IP addresses in the DNS reply can be modified as required. Each metric can be selectively disabled or enabled, such as in systems that include components that support or do not support distributed health checks. Further details of these metrics and how they are used in an example algorithm to re-order an address list to identify the "best" IP address are disclosed in the co-pending applications identified above. For purposes of the present application, such specific details regarding the metrics and their use in the algorithm are omitted herein, so as to instead focus on the techniques to acquire and communicate distributed health check information.

Figure 2:
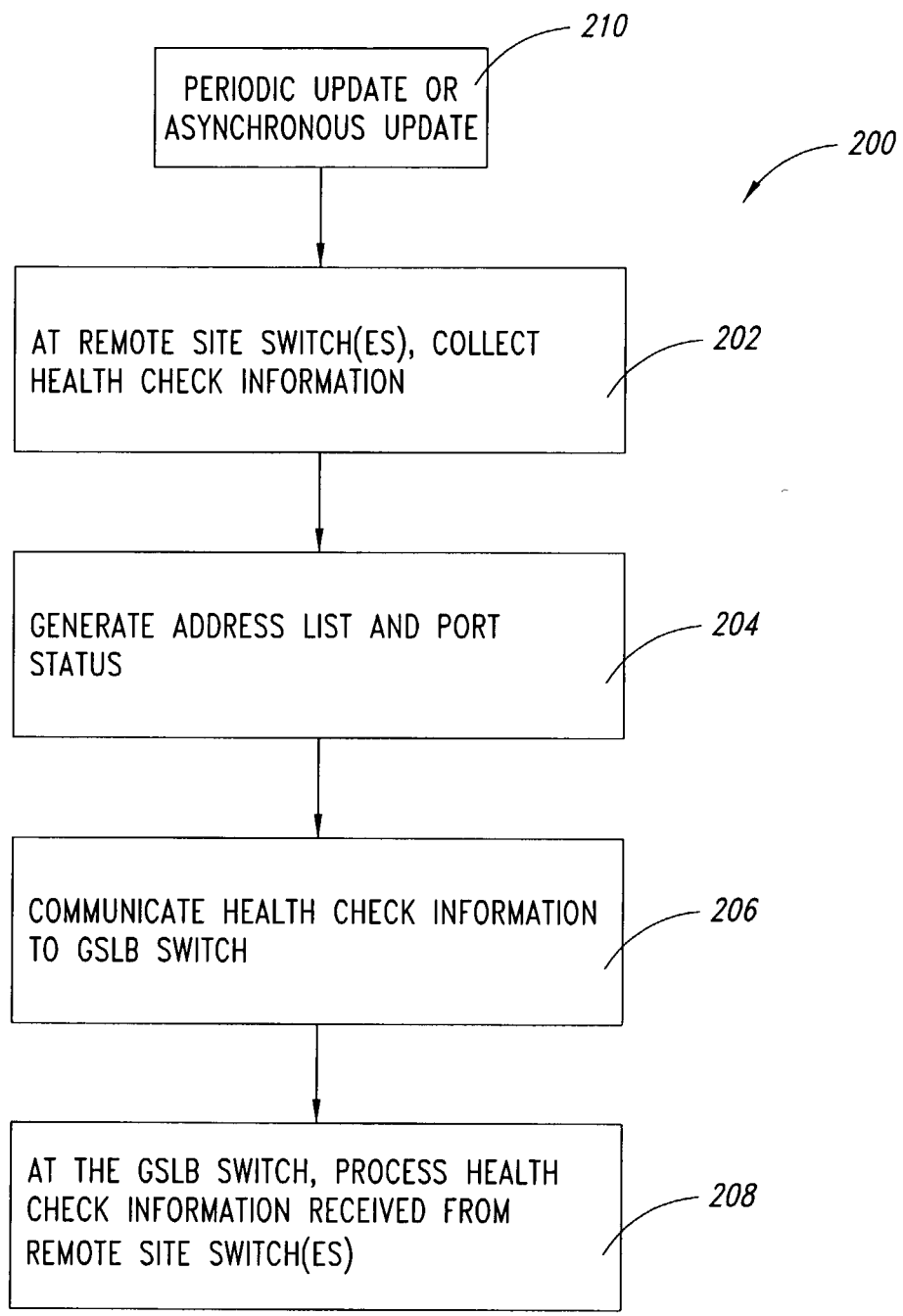
FIG. 2 illustrates in a flow chart an embodiment of a technique to perform distributed health checks for the configuration of FIG. 1.

FIG. 2 illustrates in a flow chart 200 an embodiment of a technique to perform distributed health checks for the configuration of FIG. 1. At least some of the elements of the flow chart 200 can be embodied in software or other machine-readable instruction stored on one or more machine-readable storage media. For example, such software to perform operations depicted in the flow chart 200 may be present at the remote site (e.g., the site switch 18A) in one embodiment. Moreover, it is appreciated that the various depicted operations need not necessarily occur in the exact order or sequence as shown.

At a block 210 periodic or asynchronous updates related to health check information may be performed. The updates at the block 210 will be described later below, and updates may be performed and/or communicated at any suitable location in the flow chart 200. At a block 202, health check information is collected at a remote site switch (e.g., the site switch 18A) that supports or is otherwise configured for distributed health checking. In one embodiment, this involves having the remote metric agent 407 cooperate with the health check module 402 to check the status (e.g., up or down) of the virtual ports of the VIPs at the site switch 18A. This could entail determining if at least one of the real ports associated with the virtual port of a VIP is healthy. For example, the health check module 402 can "ping" the real ports associated with a virtual port of a VIP to determine if they respond. If it finds at least one such responsive real port, it concludes that the virtual port of the VIP is healthy.

It is noted that in one embodiment of the centralized health check system, the health check module 402 is located at the GSLB switch 12, and sends health check queries to the remote metric agent 407. The remote metric agent 407 treats this health check query similarly as a normal request, and load balances the request among the real servers behind the site switch 18A. The health check information is returned to the GSLB switch 12 by the remote metric agent 407, and the health check information indicates the health status of the VIP port(s) of the site switch 18A. In contrast with the distributed health check system, the remote metric agent 407 and the health check module 402 cooperate at the block 202 to obtain the health status of the real ports mapped under the VIP ports.

It is also noted that in the centralized health check system, each health check query from the GSLB switch 12 to the site switch 18A is an individual TCP connection, in one embodiment. Thus, a separate TCP connection needs to be established to check the health status of each and every port. Furthermore, the TCP connection needs to be established and torn down each time the health check information needs to be updated at the GSLB switch 12. In one embodiment of the centralized health check, the frequency of updating the health check information may be once every 5 seconds. These multiple TCP connections use up bandwidth and requires more processing. Therefore, as will be explained later in the flow chart 200, an embodiment of the distributed health check can provide the complete health status for ports (real or VIP) and hosted applications via inclusion into a protocol message carried by a single TCP connection that is established initially when the metric collector 406 initiates communication with the remote metric agent 407. This connection is maintained in an exchange of keep-alive messages between the metric collector 406 and the remote metric agent 407. This provides a savings in speed, time, and bandwidth utilization.

At a block 204, the remote metric agent 407 generates an address list (identifying the addresses configured on the site switch 18A) and the health status of the ports corresponding to these addresses. In an embodiment, the address list and port status can correspond to the VIP addresses and VIP ports. Whether a port is up or down can be respectively indicated by a binary 1 or 0, or vice versa. It is appreciated that other types of health information, in addition to the address list and port status, can be generated at the block 204, including health status of hosted applications (e.g., whether an application hosted on a real server is available or unavailable).

At a block 206, the health information is communicated by the remote metric agent 407 to the metric collector 406 of the GSLB switch 12. In one embodiment, the health check information (e.g., address list and port status) is communicated to the GSLB switch 12 as a message forming part of a protocol communication. For instance, FIG. 3 labels this communication as "Foundry GSLB Protocol," which will be described herein next in the context of communicating health check information. It is appreciated that the Foundry GSLB Protocol is merely intended herein to illustrate an example technique to convey the distributed health check information, and that other embodiments may use different types of communication techniques to convey the distributed health check information.

The Foundry GSLB Protocol is used for communication between the metric collector 406 residing on the GSLB switch 12 and the remote metric agent 407 at the site switch 18A. A communication using this protocol can be established with a single TCP connection that remains persistent/active, without the need to re-establish a new TCP connection each time a message is to be conveyed, in one embodiment. The protocol communication includes a plurality of message types, which are listed below as non-exhaustive examples:

1. OPEN
2. ADDRESS LIST
3. REQUEST
4. RESPONSE
5. REPORT
6. SET PARAMETERS
7. NOTIFICATION
8. KEEP ALIVE
9. CLOSE
10. RTT TRAFFIC
11. OPAQUE
12. ADDRESS LIST DISTRIBUTED (DIST)
13. SET PARAMETERS DIST
14. OPEN DIST

The last three message types (12, 13, and 14) are usable with distributed health checking, while the other message types may be used either with centralized health checking or distributed health checking.

The TCP connection is established by the metric collector 406 under instruction of the switch controller 401. The metric collector 406 attempts to open a persistent communication with all specified remote metric agents 407. Where remote metric agents 407 support distributed health checks, the metric collector 406 uses the "OPEN DIST" message type to initiate and establish a TCP connection that would be used for communication of health check and other relevant information between these two entities.

When conveying the health check information, the message under the protocol (sent from the remote metric agent 407 to the metric collector 406) is under the message type "ADDRESS LIST DIST." The ADDRESS LIST DIST message includes a list of the addresses and the health status of the corresponding ports. If ports or addresses are removed or added at the site switch 18A, such updated data is also sent along with the ADDRESS LIST DIST message.

The "SET PARAMETERS" and "SET PARAMETERS DIST" message types are sent by the metric collector 406 to the remote metric agent 407. These message types are used to change protocol parameters at the remote metric agent 407. In the distributed health check model, if the metric collector 406 supports distributed health checks but the remote metric agent 407 does not (e.g., is configured for centralized health check), then the metric collector 406 sends the message with SET PARAMETERS message type to the remote metric agent 407 to ensure that the subsequent message format(s) conforms to that used for centralized health checking. The SET PARAMETERS DIST message type is used when both the metric collector 406 and the remote metric agent 407 support distributed health checking.

At a block 208, the GSLB switch 12 receives the health check information and processes it. More specifically, the metric collector 406 receives the health check information that is sent in a protocol message from the remote metric agent 407, and processes this information.

At the block 208, the GSLB switch 12 (in particular the metric collector 406) may also update databases or other stored records/data to reflect the information indicated in the health check information. For example, if new ports or addresses or hosted applications have been added (or removed) at the remote site switch 18A, the stored records at the GSLB switch 12 can be updated to add entries relevant to the newly added (or removed) ports and address and applications, such as their specific numerical address and their health status. Alternatively or in addition, the stored data can be updated to indicate the current health status of any existing address, port, or application.

The metric collector 406 makes this processed health check information and the database(s) mentioned above available to the switch controller 401. The switch controller 401 then uses this health check information as one of the metrics in the GSLB algorithm to determine which address to place at the top of the address list. The flashback metric is disabled for implementations that support distributed health checking, since the flashback metric is used to measure the time it takes for health check information to be returned to the GSLB switch 12. The re-ordered list is subsequently provided to the requesting client program 28

At a block 210, updated health check information is sent from the remote metric agent 407 to the GSLB switch 12. In one embodiment, these updates may be periodic and/or asynchronous updates. Periodic updates are sent at the block 210 periodically from the remote metric agent 407 to the metric collector to communicate to it the latest health information. In addition, asynchronous updates are also sent at the block 210 whenever there is a change in VIP or port configuration at the site switch 18A. In one embodiment, the interval between periodic health check messages is user-configurable, and can range between 2-120 seconds, for example. A default interval can be 5 seconds, for example.

In an embodiment, the remote metric agent(s) 407 is responsible for periodically generating and sending health check information for all the VIPs configured at their respective site switch. The health check reporting interval can be configured globally on the switch controller 401 or locally on an individual remote metric agent 407. Command line interface (CLI) software commands may be used by one embodiment to specify the interval, at the GSLB switch 12 or at the remote site switches. If the reporting interval is configured on the switch controller 401, the interval is communicated to the distributed health check remote metric agents 407 via the SET PARAMETERS DIST message.

The various components of the flow chart 200 repeat or are otherwise performed continuously, as the remote site switch(es) continue to obtain and send health check information to the GSLB switch 12. The GSLB switch 12 responsively continues to examine and process the health check information so as to appropriately re-order the address list for the DNS reply.

The above-described embodiments relate to use of a remote metric agent 407 and the GSLB switch 12 that both support distributed health checks. For situations where neither of these components support distributed health checks, a centralized health check technique (such as described in the co-pending applications) can be used.

Another situation is where the GSLB switch 12 supports distributed health checks, but at least one of the remote agents 407 with which it communicates does not support it. For such situations, the GSLB switch 12 can have installed therein (or otherwise be capable of enabling) its own health check module 402. The non-distributed health check remote metric agents 407 are pre-identified for this GSLB switch 12, so that its health check module 402 can send health checks to these non-distributed health check remote metric agents 407 in a centralized manner. In the protocol communication scheme, a persistent TCP connection to these non-distributed health check remote metric agents 407 initiated by the metric collector 406 uses a message type "OPEN" instead of "OPEN DIST," for example.

Note that the other remote metric agents 407 that support distributed health check will generate the health check information as described earlier and communicate it to the metric collector 406. The health check module 402 of the GSLB switch 12 does not send any health checks for these distributed health check remote metric agents 407.

In the protocol communication, a connection to these distributed health check remote metric agents 407, initiated by the metric collector 406, uses a message type "OPEN DIST" for these agents.

The flashback metric is disabled, in an embodiment, for this situation where some remote metric agents support distributed health checks while some may not. It is advisable in some instances to enable the flashback metric (via CLI or other technique) only if the user is absolutely certain that none of the remote metric agents 407 support distributed health checks.

Yet another situation is where the GSLB switch 12 does not support distributed health checks, but at least one of the remote metric agents 407 with which it communicates does support it. The remote metric agent 407 can first detect this limitation of the GSLB switch 12, for instance, if its metric collector 406 uses the message type "OPEN" when it first establishes a protocol communication with the remote metric agent 407. Alternatively or in addition, the non-distributed health check GSLB switch 12 can be pre-identified for the remote metric agent 407, or it may detect this limitation if it explicitly receives a query for health check information from the GSLB switch 12. After identification of the non-distributed health check GSLB switch 12, the remote metric agent 407 can send its address list information to the GSLB switch 12 with a message type "ADDRESS LIST" (instead of "ADDRESS LIST DIST") or other format compatible with a centralized health check implementation. Note that unlike the ADDRESS LIST DIST message sent by the distributed health check remote agent 407 to a distributed health check metric collector 406, the ADDRESS LIST message sent to a non-distributed health check metric collector 406 does not contain any health check information. In one embodiment of centralized health check, the ADDRESS LIST message merely serves the purpose of communicating the addresses configured on site switch 18A to the metric collector 406.

In one embodiment of an optimization algorithm utilized by GSLB switch 12 and executed by the switch controller 401 to process the IP address list received from DNS server 16, the health check metric is used as the first criteria to determine which IP address is "best" and to preliminarily place that IP address at the top of the list of IP addresses. Thereafter, other metrics may be used to perform additional re-ordering of the IP address list, such as a connection-load metric, FIT, flashback (for systems that include non-distributed health check components), and so forth. In one embodiment, the health check information, whether obtained by either the distributed or the centralized techniques, are considered in the same priority in the algorithm—only the process by which this health check information is obtained and communicated is different.

In systems that include both distributed and non-distributed health check components, the flashback metric can be selectively enabled or disabled. When used in connection with all non-distributed health check components, the flashback metric is enabled and placed in the algorithm just prior to the least response metric, in an embodiment, when considering a list of IP addresses corresponding to the servers and applications associated with a remote metric agent 407 that does not support distributed health check.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
a first network device to site switch, adapted to collect health check information indicative of access conditions to components for which the first network device performs switching, wherein the collection of health check information occurs independently of a request; and
a metric agent, at the first network device, adapted to communicate the collected health check information to a second network device to load balance, the communication occurring a plurality of times over a persistent connection between the first network device and the second network device, wherein the persistent connection comprises a single TCP connection initiated by the second network device; and
wherein the health check information comprises information indicative of which ports of one or more host servers coupled to the first network device are up or down and the health status of applications hosted on the one or more host servers.

2. The system of claim 1, wherein the health check information further comprises information indicative of access conditions to an application hosted on the one or more host servers.

3. The system of claim 1, further comprising a plurality of other network devices to site switch that are not adapted to support distributed health check information collection, wherein the plurality of other network devices to site switch are identifiable by the second network device to enable the second network device to process their respective health check information.

4. The system of claim 1, further comprising a third network device to load balance that is not enabled to support distributed health check information collection by its corresponding network devices to site switch, wherein the corresponding network devices to site switch are coupled to respond to health check queries from the third network device and to modify other information into a format that is adapted to be processed by the third network device.

5. The system of claim 1 wherein a time interval to send the collected health check information from the first network device to the second network device is specified globally for the first network device at the second network device.

6. The system of claim 1, wherein the metric agent at the first network device is adapted to communicate the health check information to the second network device independent of a query for the health check information from the second network device.

7. A method of providing load balancing, the method comprising:
  establishing a persistent connection between a first network device to load balance and at least one second network device to site switch, the at least one second network device remote from the first network device, wherein the persistent connection comprises a single TCP connection initiated by the first network device;
  receiving a plurality of times, at the first network device through the persistent connection, health check information collected at the at least one second network device and indicative of access conditions to respective host servers for which the at least one second network device performs switching, wherein the collection of health check information occurs independently of a request;
  arranging, at the first network device, network addresses in accordance with a set of performance metrics that include the health check information collected by and received from the at least one second network device; and
  disabling a flashback metric, from among the set of performance metrics, indicative of a time to respond to a health check request sent by the first network device.

8. The method of claim 7, wherein the health check information includes addresses associated with each of the at least one second network device and status indicative of which ports corresponding to the addresses are up or are down, the addresses and status being present in a message sent from each of the at least one second network device, wherein receiving the health check information collected by the at least one second network device through the persistent connection comprises:
  maintaining the persistent connection between the first network device and each of the at least one second network device using a keep-alive message type;
  receiving, from each of the at least one second network device, the message via each persistent connection and independently of a query for the message from the first network device; and
  receiving, from each of the at least one second network device and independently of a query for the message from the first network device, an update to the health check information in an additional message after a specified time interval, and including information indicative of a change in addresses or ports at the each of the at least one second network device.

9. The method of claim 7, further comprising identifying other network devices to site switch that collect health check information in response to requests from the first network device.

10. The method of claim 7, further comprising:
  specifying, at the first network device and globally for all of the at least one second network device, a time interval to provide the health check information to the first network device; or
  specifying, individually for each of the at least one second network device, the time interval to be used by that specific second network device to provide the health check information to the first network device.

11. The method of claim 7, wherein the received health check information, collected at the at least one second network device, includes information indicative of access to applications hosted at the host servers.

12. The method of claim 7, wherein the network addresses include virtual IP addresses, at least one of said virtual IP addresses being configured at the at least one second network device and corresponding to at least one of the host servers of the at least one second network device, wherein the first network device is adapted to perform said arranging to balance traffic between a plurality of the at least one second network device.

13. An article of manufacture, comprising:
  a non-transitory storage medium having instructions stored thereon that are executable by a first network device to load balance, to:
  process health check information remotely collected by at least one of a plurality of second network devices to site switch, the health check information indicative of access conditions to respective host servers for which at least one of the second network devices performs switching, wherein the collection of health check information occurs independently of a request; and
  arrange network addresses in accordance with a set of performance metrics that include the health check information,
  wherein one of the performance metrics includes a flashback metric representing a speed to respond to a request from the first network device for health check information, the flashback metric being disabled based on the health check information remotely collected a plurality of times over a persistent connection by at least one of the second network devices, wherein the persistent connection comprises a single TCP connection initiated by the first network device.

14. The article of manufacture of claim 13, wherein the network addresses include virtual IP addresses, at least one of said virtual IP addresses being configured at each respective second network device and each of the virtual IP addresses corresponding to at least one of the host servers of the respective second network device, wherein the first network device is adapted to arrange network addresses.

15. The article of manufacture of claim 13, wherein the health check information is received by the first network device through a persistent connection to each of the second network devices, wherein the persistent connection comprises a single TCP connection initiated by the first network device.

16. The article of manufacture of claim 15, wherein the persistent connection uses a keep-alive message type to maintain persistency to enable the health check information to be conveyed to the first network device independently of a query for the health check information by the first network device, and without having to establish a new connection to separately convey health check information from the at least one of the second network devices.

17. An article of manufacture, comprising:
- a non-transitory storage medium having instructions stored thereon that are executable by a first network device to load balance, to:
- establish a persistent connection between the first network device and at least one of a plurality of second network devices to site switch remote from the first network device, wherein the persistent connection comprises a single TCP connection initiated by the first network device, and;
- process health check information remotely collected by the at least one of the plurality of second network devices and indicative of access conditions to respective host servers for which the at least one of the plurality of second network devices perform switching, the health check information being received a plurality of times by the first network device through the persistent connection between the at least one of the plurality of second network devices, and the collection of health check information occurring independently of a request; and
- arrange network addresses in accordance with a set of performance metrics that include the health check information,
- wherein the health check information includes addresses associated with each of the plurality of second network devices and includes indications of which ports associated with each of the addresses are up or are down.

18. The article of manufacture of claim 17, wherein a time interval for the at least one of the plurality of second network devices to provide the health check information is individually specified for each of the at least one of the plurality of second network devices.

19. A system comprising:
- a first network device to site switch, adapted to receive health check information, the health check information being indicative of access conditions to components for which the first network device collects health check information and for which the first network device performs switching, wherein the collection of health check information occurs independently of a request; and
- a metric agent, at the first network device, adapted to communicate the health check information to a second network device to load balance, the communication occurring a plurality of times using a persistent connection between the first network device and the second network device, wherein the persistent connection comprises a single TCP connection initiated by the second network device; and
- wherein the first network device is adapted to be communicatively coupled to the second network device and is adapted to convey the health check information a plurality of times on the persistent connection to the second network device as part of a keep-alive message, wherein the health check information comprises information indicative of which ports of one or more host servers coupled to the first network device are up or down and the health status of applications hosted on the one or more host servers.

20. A system to balance load, the system comprising:
- a first network device to site switch, to collect health check information indicative of access conditions to components for which the first network device performs switching and the health status of applications hosted on one or more servers coupled to the first network device, wherein the collection of health check information occurs independently of a request; and
- a metric agent, at the first network device, to communicate the collected health check information to a second network device to load balance, the communication occurring a plurality of times using a persistent connection between the first network device and the second network device, wherein the persistent connection comprises a single TCP connection initiated by the second network device; and
- wherein a flashback metric representing a time to respond to a query for the health check information is disabled based on the collection of the health check information distributed from the second network device to the first network device.

\* \* \* \* \*